US012604298B2

(12) United States Patent
Li et al.

(10) Patent No.: US 12,604,298 B2
(45) Date of Patent: Apr. 14, 2026

(54) METHODS, DEVICES, AND SYSTEMS FOR COORDINATING LEAVING PROCEDURE

(71) Applicant: ZTE Corporation, Shenzhen (CN)

(72) Inventors: Wenting Li, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 301 days.

(21) Appl. No.: 18/139,566

(22) Filed: Apr. 26, 2023

(65) Prior Publication Data

US 2023/0262655 A1    Aug. 17, 2023

Related U.S. Application Data

(63) Continuation of application No. PCT/CN2021/070600, filed on Jan. 7, 2021.

(51) Int. Cl.
| | |
|---|---|
| *H04W 68/02* | (2009.01) |
| *H04W 60/06* | (2009.01) |
| *H04W 88/06* | (2009.01) |

(52) U.S. Cl.
CPC ........... *H04W 68/02* (2013.01); *H04W 60/06* (2013.01); *H04W 88/06* (2013.01)

(58) Field of Classification Search
CPC ..... H04W 72/23; H04W 24/02; H04W 76/27; H04W 4/70; H04W 48/16; H04W 48/18;
(Continued)

(56) References Cited

U.S. PATENT DOCUMENTS 9,185,580 B2 * 11/2015 Jung ..................... H04W 24/02
10,251,047 B2 * 4/2019 Karampatsis ......... H04W 12/08
(Continued)

FOREIGN PATENT DOCUMENTS

| CA | 2781630 C | * | 5/2019 | ............ H04W 76/27 |
| CA | 3038940 C | * | 4/2021 | ........ H04W 52/0229 |
(Continued)

OTHER PUBLICATIONS

"IEEE Standard for Licensed/Unlicensed Spectrum Interoperability in Wireless Mobile Networks," in IEEE Std 1932.1-2024 , vol. No., pp. 1-78, Jul. 15, 2024, doi: 10.1109/IEEESTD.2024. 10597148. (Year: 2024).*
Extended European Search Report regarding Application No. EP 21 91 6766 dated Jun. 24, 2024, 14 pages.
(Continued)

*Primary Examiner* — William D Cumming
(74) *Attorney, Agent, or Firm* — Crowell & Moring LLP

(57) ABSTRACT

Methods, systems and devices for configuring signal resource for coordinating leaving procedures for one or more devices including multiple subscriber identity modules (Multi-SIMs) or for one or more devices connecting multiple networks with one subscriber identity module (SIM) are described. One method includes performing, by a user equipment (UE) corresponding to multiple networks, sending a mobile terminated (MT) filter assistance information by: determining, by the UE, the MT filter assistance information; and sending, by the UE, the MT filter assistance information to a network. Another method includes receiving, by a UE including Multi-SIMs corresponding to multiple radio access networks (RANs), a paging message from a RAN of the multiple RANs, wherein the paging message comprises a first indication indicating a paging cause; and the paging message comprises a second indication indicating whether the paging cause is supported in the paging message.

15 Claims, 31 Drawing Sheets

(58) Field of Classification Search

CPC ....... H04W 68/02; H04W 8/05; H04W 12/02; H04W 12/06; H04W 12/08; H04W 4/23; H04W 76/19

USPC ...... 455/67.11, 458; 370/252, 311, 331, 328

See application file for complete search history.

(56) References Cited

U.S. PATENT DOCUMENTS

| | | | | |
|---|---|---|---|---|
| 10,334,517 | B2 * | 6/2019 | Wakabayashi | ........ H04W 48/18 |
| 10,462,736 | B2 * | 10/2019 | Wakabayashi | .......... H04W 4/70 |
| 11,166,228 | B2 * | 11/2021 | Wakabayashi | .......... H04W 4/70 |
| 11,350,263 | B2 * | 5/2022 | Karampatsis | ......... H04W 12/06 |
| 11,812,499 | B2 * | 11/2023 | Karampatsis | ......... H04W 12/08 |
| 2010/0279698 | A1 * | 11/2010 | Wong | ................... H04W 88/06 |
| | | | | 455/450 |
| 2013/0188543 | A1 * | 7/2013 | Dwyer | ................. H04W 76/27 |
| | | | | 370/311 |
| 2013/0196604 | A1 * | 8/2013 | Jung | .................... H04W 24/02 |
| | | | | 455/67.11 |
| 2013/0316720 | A1 * | 11/2013 | Dwyer | ............. H04W 52/0206 |
| | | | | 455/450 |
| 2015/0195753 | A1 * | 7/2015 | Jung | .................... H04W 76/19 |
| | | | | 370/331 |
| 2015/0208462 | A1 * | 7/2015 | Lee | ....................... H04W 72/23 |
| | | | | 370/311 |
| 2016/0095050 | A1 * | 3/2016 | Lindheimer | .......... H04W 48/16 |
| | | | | 455/435.2 |
| 2016/0100305 | A1 * | 4/2016 | Karampatsis | ......... H04W 8/005 |
| | | | | 370/328 |
| 2016/0112893 | A1 * | 4/2016 | Jung | .................... H04W 24/02 |
| | | | | 370/252 |
| 2016/0242111 | A1 * | 8/2016 | Wakabayashi | .......... H04W 4/70 |
| 2018/0077682 | A1 | 3/2018 | Li et al. | |
| 2019/0230489 | A1 * | 7/2019 | Karampatsis | ......... H04W 12/02 |
| 2019/0261265 | A1 * | 8/2019 | Wakabayashi | .......... H04W 4/70 |
| 2020/0015155 | A1 * | 1/2020 | Wakabayashi | ........ H04W 48/18 |
| 2020/0029304 | A1 | 1/2020 | Centonza et al. | |
| 2020/0351818 | A1 | 11/2020 | Park et al. | |
| 2022/0295255 | A1 * | 9/2022 | Karampatsis | ......... H04W 4/023 |
| 2023/0262655 | A1 * | 8/2023 | Li | ......................... H04W 68/02 |
| | | | | 455/458 |
| 2024/0008143 | A1 * | 1/2024 | Li | ......................... H04W 76/20 |
| 2024/0107409 | A1 | 3/2024 | Da Silva et al. | |

FOREIGN PATENT DOCUMENTS

| | | | | | |
|---|---|---|---|---|---|
| CN | 101480103 | A | * | 7/2009 | ............ H04W 88/06 |
| CN | 105594270 | A | | 5/2016 | |
| CN | 111918391 | A | | 11/2020 | |
| CN | 115735384 | A | * | 3/2023 | ............ H04W 48/18 |
| CN | 116349328 | A | * | 6/2023 | ............ H04W 76/16 |
| EP | 2036373 | B1 | * | 5/2012 | ............ H04W 88/06 |
| EP | 2592895 | B1 | * | 7/2014 | ........ H04W 52/0206 |
| EP | 2887740 | A1 | * | 6/2015 | ............ H04W 76/27 |
| EP | 2592894 | B1 | * | 4/2016 | ........ H04W 52/0229 |
| EP | 3069556 | B1 | * | 4/2019 | ............ H04W 48/18 |
| GB | 2497902 | A | * | 6/2013 | ............ H04W 24/10 |
| GB | 2520877 | A | * | 6/2015 | ............ H04W 24/10 |
| JP | 2009542149 | A | * | 11/2009 | ............ H04W 88/06 |
| JP | 2015523031 | A | * | 8/2015 | ............ H04W 76/27 |
| JP | 5927344 | B2 | * | 6/2016 | ............ H04W 76/27 |
| JP | 2016131408 | A | * | 7/2016 | ............ H04W 76/27 |
| JP | 2024502525 | A | * | 1/2024 | ............ H04W 76/27 |
| JP | 7681691 | B2 | * | 5/2025 | ............ H04W 76/20 |
| KR | 20120099083 | A | * | 9/2012 | ........ H04W 52/0206 |
| KR | 20150036072 | A | * | 4/2015 | ............ H04W 76/27 |
| WO | WO-2008001061 | A1 | * | 1/2008 | ............ H04W 88/06 |
| WO | WO-2011060997 | A1 | * | 5/2011 | ............ H04W 72/04 |
| WO | WO-2014014286 | A1 | * | 1/2014 | ............ H04W 76/27 |
| WO | WO-2014025211 | A1 | * | 2/2014 | ............ H04W 72/23 |
| WO | WO-2014189428 | A1 | * | 11/2014 | ............ H04W 48/14 |
| WO | WO 2019094799 | A1 | | 5/2019 | |
| WO | WO 2020222531 | A1 | | 11/2020 | |
| WO | WO-2022147707 | A1 | * | 7/2022 | ............ H04W 76/16 |

OTHER PUBLICATIONS

Partial Supplementary European Search Report and Provisional Opinion regarding Application No. 21916766.5 dated Apr. 3, 2024, 16 pages.

OPPO., "Discussion on graceful leaving and busy indication," 3GPP Draft; R2-2008872, 3rd Generation Partnership Project (3GPP), Mobile Competence Centre, 650, Route Des Lucioles; F-06921 Sophia-Antipolis Cedex, France, vol. RAN WG2, No. electronic; Nov. 2, 2020-Nov. 13, 2020, Oct. 23, 2020, XP052361926, 9 pages, Retrieved from the Internet: https://ftp.3gpp.org/tsg_ran/WG2_RL2/TSGR2_112-e/Docs/R2-2008872.zip.

Anonymous, "RRC connection Release—Lauro—Expert Opinion LTE University," Dec. 18, 2013, XP055359613, 4 pages, Retrieved from the Internet: http://lteuniversity.com/get_trained/expert_opinionl/b/lauroortigoza/archive/2013/12/18/rrc-connection-release.aspx.

Huawei et al., "KI#3: Conclusion Proposal," 3GPP Draft; S2-2008686, 3rd Generation Partnership Project (3GPP), Mobile Competence Centre, 650, Route Des Lucioles; F-06921 Sophia-Antipolis Cedex, France, vol. SA WG2, No. e-meeting, Nov. 16, 2020-Nov. 20, 2020, Nov. 9, 2020, XP052465678, 3 pages, Retrieved from the Internet: https://ftp.3gpp.org/tsg_sa/WG2_Arch/TSGS2_142e_Electronic/Docs/S22008686. zip.

International Search Report and Written Opinion regarding PCT/CN2021/070600 dated Sep. 28, 2021, 7 pages.

3GPP, "Study on system enablers for devices having multiple Universal Subscriber Identify Modules (USIM)(Release 17)," *3GPP TR 23.761 V0.5.0*, Sep. 30, 2020.

Japanese-language Notice of Allowance with machine translation issued in Japanese Patent Application No. 2023-525501 dated Apr. 18, 2025 (5 pages).

3GPP TR 23.761 V1.2.0 (Nov. 2020); 3rd Generation Partnership Project, Technical Specification Group Services and System Aspects, Study on system enablers for devices having multiple Universal Subscriber Identity Modules (USIM) (Release 17), Valbonne—France, Nov. 2020, 108 pages.

International Search Report and Written Opinion regarding PCT/CN2021/070601 dated Sep. 28, 2021, 7 pages.

Charter Communications, "3GPP TSG-RAN WG2 Meeting #112 Electronic, R2-2010477," *Network Switching jcJr Multi-SIM UEs*, Nov. 13, 2020, 4 pages.

Qualcomm Incorporated, "SA WG2 Meeting #135, S2-1909744," *SolutionjcJr paging collision avoidance*, Oct. 18, 2019, 4 pages.

Mediatek Inc, "3GPP TSG-RANWG2 Meeting #111 electronic, R2-2007191," *SupportjcJr Multi-SIM Devices*, Aug. 28, 2020, 6 pages.

Extended European Search Report regarding EP 21 91 6765 dated Nov. 2, 2023.

Nokia et al., "Solution for improved paging in MUSIM devices (KI#I,2,3)," 3GPP Draft, S2-2000855, 3rd Generation Partnership Project (3GPP), Mobile Competence Centre; 650, Route Des Lucioles, F-06921 Sophia-Antipolis Cedex, France, vol. SA WG2, No. Icheon, Korea, Jan. 3, 2020-Jan. 17, 2020, Jan. 7, 2020 Retrieved from the Internet: https://ftp.3gpp.org/tsg_sa/WG2_Arch/TSG2_136AH_Incheon/Docs/222000855.zipS2-2000855_Solution_paging_MUSIM.docx.

Japanese-language Office Action with English translation regarding Application No. 2023-525501 dated Feb. 4, 2025 (5 pages).

3GPP TR 23.761, V1.2.0 (Nov. 2020), 3rd Generation Partnership Project, Technical Specification Group Services and System Aspects, "Study on system enablers for devices having multiple Universal Subscriber Identity Modules (USIM)," (Release 17), Nov. 28, 2020, 108 pages.

Japanese Office Action and English translation of Office Action regarding Application No. 2023-525501 dated Aug. 28, 2024, 6 pages.

Nokia, Nokia Shanghai Bell, "Scenarios and Impact analysis for Switching Notification," 3GPP TSG-RAN WG2 Meeting #112 Electronic R2-2009265, Nov. 2020, 10 pages.

Non-Final Office Action issued in related U.S. Appl. No. 18/219,188 dated Jul. 23, 2025, 9 pages.

(56)                           References Cited

OTHER PUBLICATIONS

Final Office Action issued in related U.S. Appl. No. 18/219,188 dated Jan. 7, 2026 (13 pages).
European Patent Office Office Action issued in Application No. 21 916 765.7 dated Jan. 21, 2026, (6 pages).

* cited by examiner

100

400 determining, by the UE, a leaving type in response to a particular scenario;

410 coordinating, by the UE, a leaving procedure based on at least one of the leaving type, or the particular scenario.

500 receiving, by the RAN node, a switch notification indicating leaving assistance information;

510 determining, by the RAN node, a switch configuration for a leaving configuration;

520 sending, by the RAN node, a switching response to a user equipment (UE)

600 receiving, by the RAN node, information that a simple procedure indication;

610 avoiding, by the RAN node upon receiving the information, to trigger a specific procedure.

Figures 22, 23:
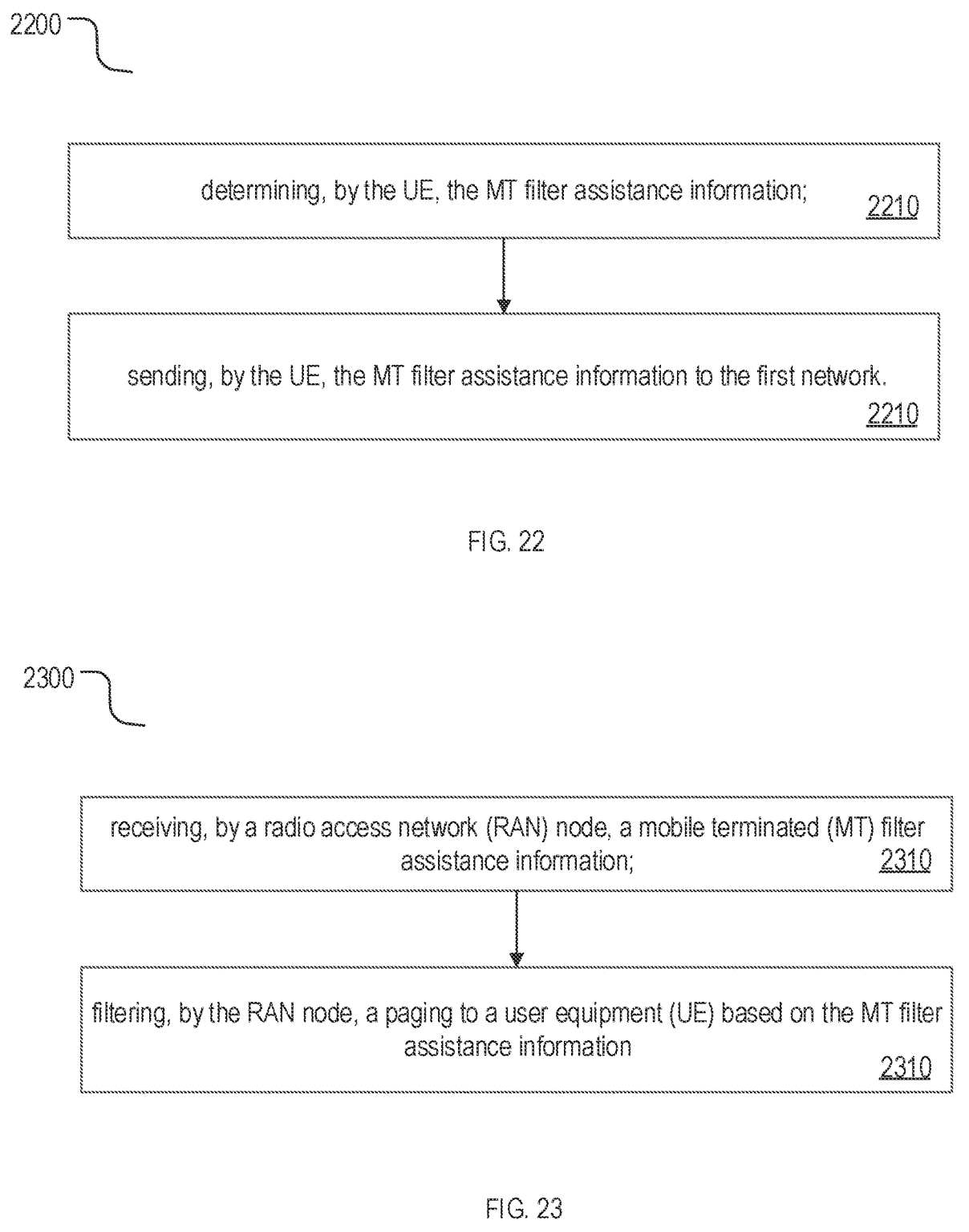

| determining, by the UE, the MT filter assistance information;    2210 |
| --- |

| sending, by the UE, the MT filter assistance information to the first network.    2210 |
| --- |

| receiving, by a radio access network (RAN) node, a mobile terminated (MT) filter assistance information;    2310 |
| --- |

| filtering, by the RAN node, a paging to a user equipment (UE) based on the MT filter assistance information    2310 |
| --- |

Figure 24:
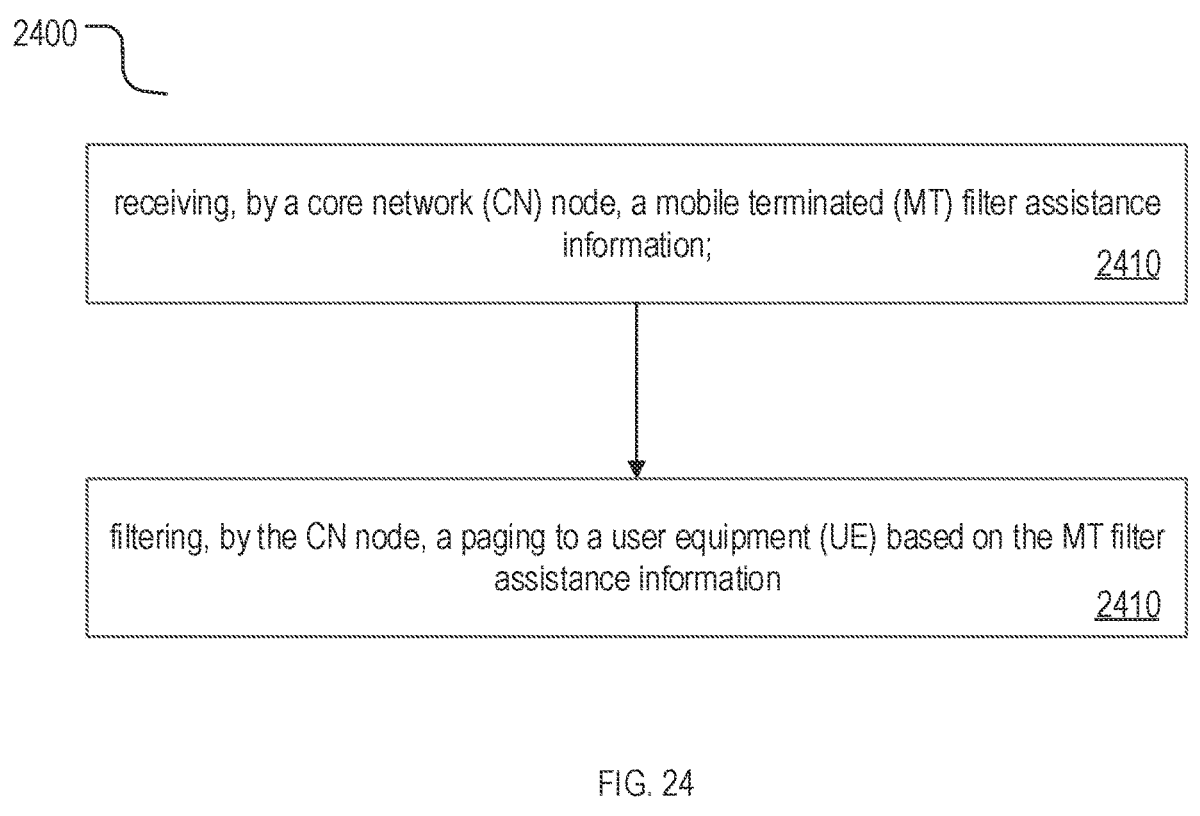

```
receiving, by a core network (CN) node, a mobile terminated (MT) filter assistance
information;
                                                                        2410
```

```
filtering, by the CN node, a paging to a user equipment (UE) based on the MT filter
assistance information
                                                                        2410
```

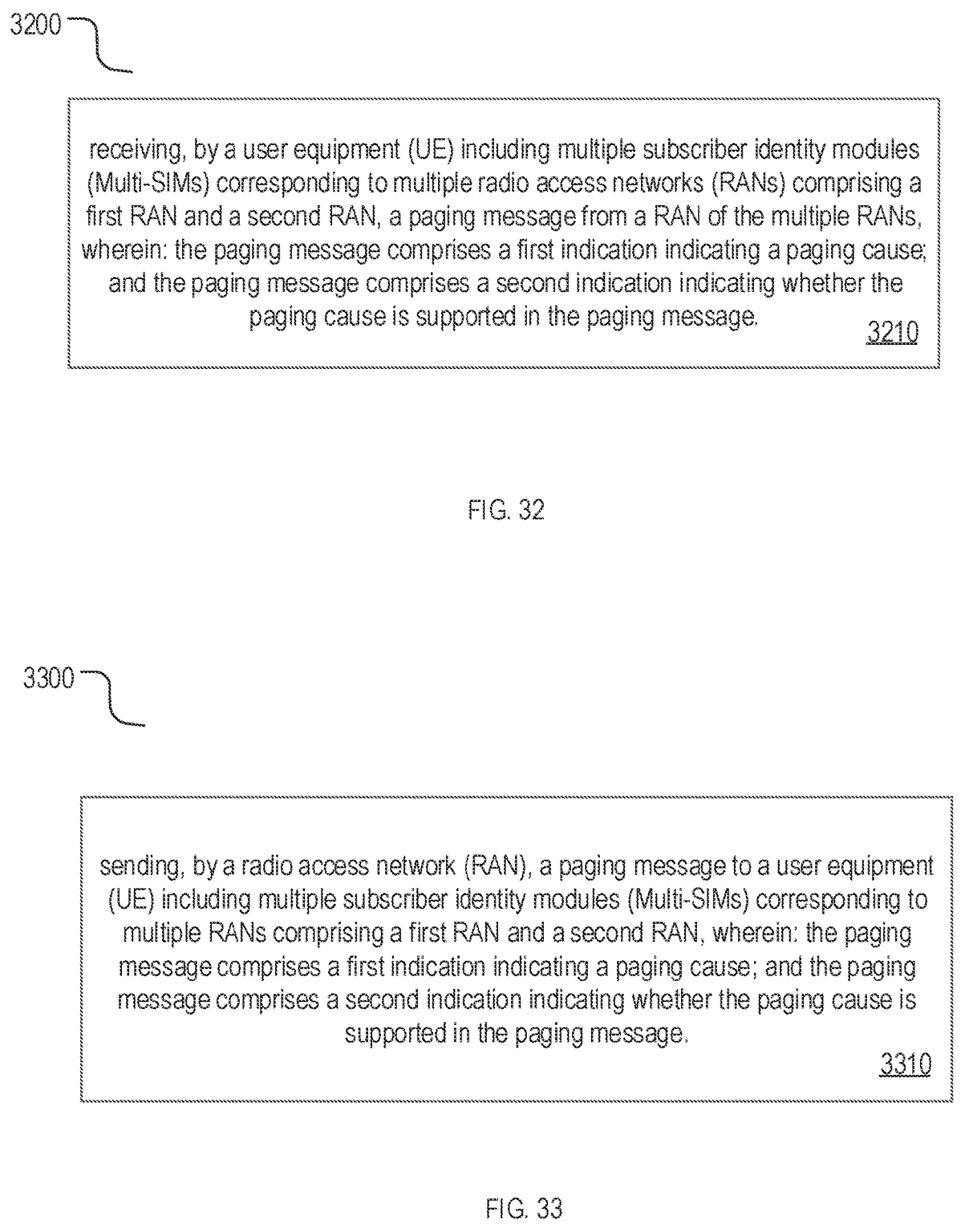

> receiving, by a user equipment (UE) including multiple subscriber identity modules (Multi-SIMs) corresponding to multiple radio access networks (RANs) comprising a first RAN and a second RAN, a paging message from a RAN of the multiple RANs, wherein: the paging message comprises a first indication indicating a paging cause; and the paging message comprises a second indication indicating whether the paging cause is supported in the paging message.
>
> <u>3210</u>

> sending, by a radio access network (RAN), a paging message to a user equipment (UE) including multiple subscriber identity modules (Multi-SIMs) corresponding to multiple RANs comprising a first RAN and a second RAN, wherein: the paging message comprises a first indication indicating a paging cause; and the paging message comprises a second indication indicating whether the paging cause is supported in the paging message.
>
> <u>3310</u>

FIG. 33

METHODS, DEVICES, AND SYSTEMS FOR COORDINATING LEAVING PROCEDURE

CROSS-REFERENCE TO RELATED APPLICATION

This application is a continuation application of PCT International Patent Application No. PCT/CN2021/070600, filed with the China National Intellectual Property Administration, PRC on Jan. 7, 2021, which is herein incorporated by reference in its entirety.

TECHNICAL FIELD

The present disclosure is directed generally to wireless communications. Particularly, the present disclosure relates to methods, devices, and systems for coordinating leaving procedures for one or more devices including multiple subscriber identity modules (Multi-SIMs) or for one or more devices connecting multiple networks with one subscriber identity module (SIM).

BACKGROUND

Wireless communication technologies are moving the world toward an increasingly connected and networked society. High-speed and low-latency wireless communications rely on efficient network resource management and allocation between user equipment and wireless access network nodes (including but not limited to base stations). A new generation network is expected to provide high speed, low latency and ultra-reliable communication capabilities and fulfill the requirements from different industries and users.

For the 5th Generation mobile communication technology, a user equipment (UE), for example, a smart phone, may have multiple subscriber identity modules (Multi-SIMs). The UE may register with and connect to more than one network nodes, for example, more than one radio access network (RAN) node and/or more than one core network (CN) node. The UE may connect with a first network. When the UE needs to connect to a second network, the UE needs to configure and/or coordinate a leaving procedure for the first network and the second network, so as to provide an efficient system for various scenarios. However, the details of leaving procedures and the configuration/coordination of the leaving procedures among the UE and the more than one network remain unclear, which hinders an efficient wireless communication system.

The present disclosure may address at least some of issues/problems associated with the existing system and describes various embodiments for leaving procedures and their configuration/coordination, improving the performance of the wireless communication.

SUMMARY

This document relates to methods, systems, and devices for wireless communication, and more specifically, for coordinating leaving procedures for one or more devices including multiple subscriber identity modules (Multi-SIMs) or for one or more devices connecting multiple networks with one subscriber identity module (SIM). For the one or more devices connecting multiple networks with one subscriber identity module (SIM), it including at least the following two scenarios: for the roaming UE, it may connect multiple networks for different slices, which also need the UE coordination among the multiple networks; and for the video, imaging and audio for professional applications (VIAPA), it may require to study means to enable a UE to receive data services from one network, and paging as well as data services from another network simultaneously, which also need the UE coordination among the multiple networks.

In one embodiment, the present disclosure describes a method for wireless communication. The method includes configuring, by a user equipment (UE), a leaving procedure for multiple networks by: determining, by the UE, a leaving type in response to a particular scenario; and coordinating, by the UE, a leaving procedure based on at least one of the leaving type, or the particular scenario.

In another embodiment, the present disclosure describes a method for wireless communication. The method includes receiving, by a radio access network (RAN) node, a switch notification indicating a leaving type or a scenario; determining, by the RAN node, a switch configuration for the leaving type or the scenario; and sending, by the RAN node, a switching response to a user equipment (UE).

In another embodiment, the present disclosure describes a method for wireless communication. The method includes receiving, by the RAN node, information that a simple procedure indication; and avoiding, by the RAN node upon receiving the information, to trigger a specific procedure.

In another embodiment, the present disclosure describes a method for wireless communication. The method includes performing, by a user equipment (UE) corresponding to multiple networks comprising a first network and a second network, sending a mobile terminated (MT) filter assistance information by: determining, by the UE, the MT filter assistance information; and sending, by the UE, the MT filter assistance information to the first network.

In another embodiment, the present disclosure describes a method for wireless communication. The method includes receiving, by a radio access network (RAN) node, a mobile terminated (MT) filter assistance information; and filtering, by the RAN node, a paging to a user equipment (UE) based on the MT filter assistance information.

In another embodiment, the present disclosure describes a method for wireless communication. The method includes receiving, by a core network (CN) node, a mobile terminated (MT) filter assistance information; and filtering, by the CN node, a paging to a user equipment (UE) based on the MT filter assistance information.

In another embodiment, the present disclosure describes a method for wireless communication. The method includes receiving, by a user equipment (UE) including multiple subscriber identity modules (Multi-SIMs) corresponding to multiple radio access networks (RANs) comprising a first RAN and a second RAN, a paging message from a RAN of the multiple RANs, wherein: the paging message comprises a first indication indicating a paging cause; and the paging message comprises a second indication indicating whether the paging cause is supported in the paging message.

In another embodiment, the present disclosure describes a method for wireless communication. The method includes sending, by a radio access network (RAN), a paging message to a user equipment (UE) including multiple subscriber identity modules (Multi-SIMs) corresponding to multiple RANs comprising a first RAN and a second RAN, wherein: the paging message comprises a first indication indicating a paging cause; and the paging message comprises a second indication indicating whether the paging cause is supported in the paging message.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

FIG. 5 shows a flow diagram of a method for wireless communication.

FIG. 6 shows a flow diagram of a method for wireless communication.

FIG. 22 shows a flow diagram of a method for wireless communication.

FIG. 23 shows a flow diagram of a method for wireless communication.

FIG. 24 shows a flow diagram of a method for wireless communication.

FIG. 32 shows a flow diagram of a method for wireless communication.

FIG. 33 shows a flow diagram of a method for wireless communication.

DETAILED DESCRIPTION

Figure 1:
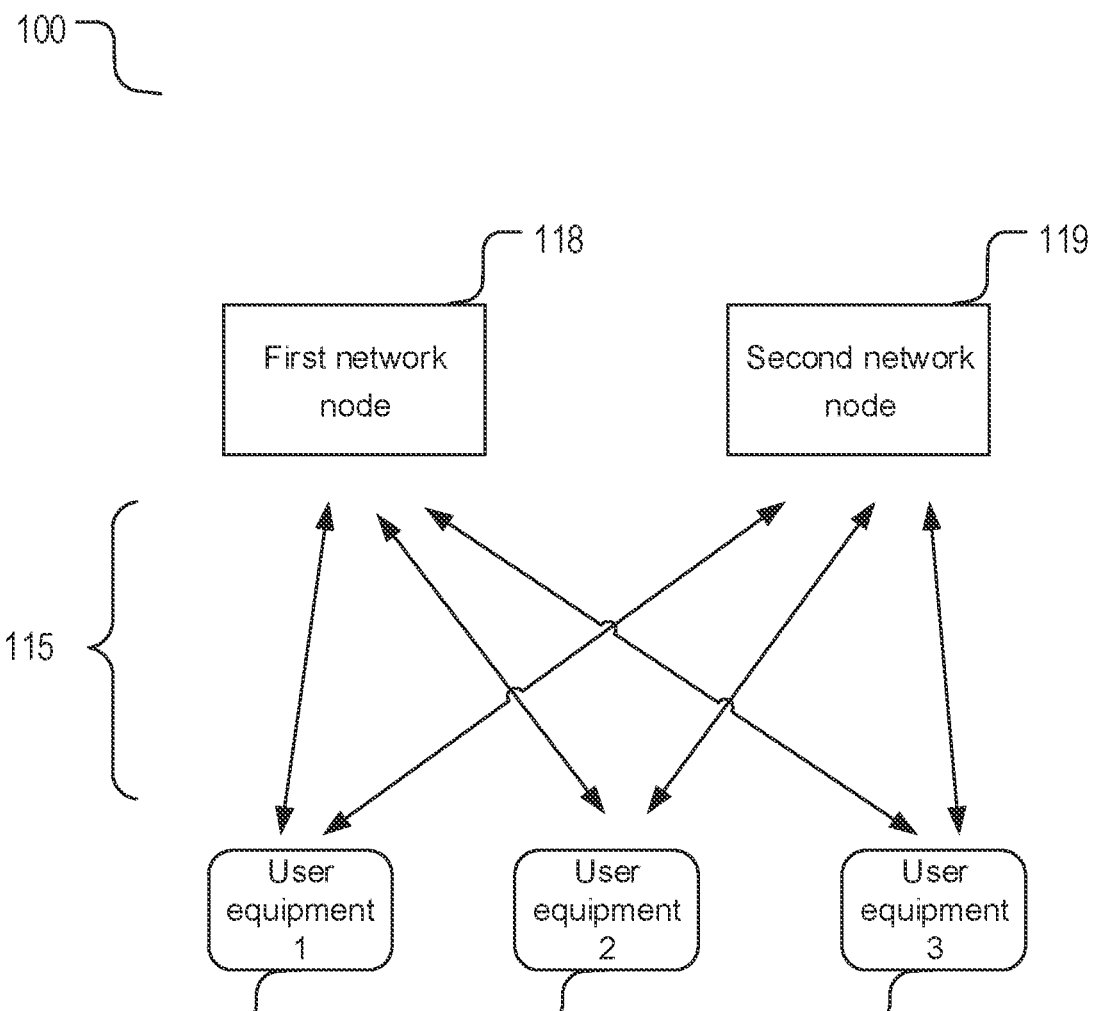
FIG. 1 shows an example of a wireless communication system include more than one network nodes and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for coordinating leaving procedures for one or more devices including multiple subscriber identity modules (Multi-SIMs).

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfill the requirements from different industries and users.

The present disclosure describes various embodiments for transmitting initial access information to a user equipment. FIG. 1 shows a wireless communication system 100 including more than one wireless network nodes (118 and 119) and one or more user equipment (UE) (110, 111, and 112).

For the 5th Generation mobile communication technology, a UE 110, for example, a smart phone, may have a single subscriber identity module (SIM) or multiple subscriber identity modules (Multi-SIMs). When the UE has a single SIM, the UE may connect to one network node 118, for example, a radio access network (RAN) node and/or a core network (CN) node, or may connect to more than one network nodes (118 and 119), for example, two RAN nodes and/or two CN nodes. When the UE has Multi-SIMs, the UE may connect to more than one network nodes (118 and 119), for example, two RAN nodes, two CN nodes, and/or one RAN node and one CN node.

The wireless network node (118 and 119) may include a network base station, which may be a nodeB (NB, e.g., a gNB) in a mobile telecommunications context. Each of the UE (110, 111, and/or 112) may wirelessly communicate with the wireless network node (118 and/or 119) via one or more radio channels 115. For example, the first UE 110 may wirelessly communicate with the first network node 118 via a channel including a plurality of radio channels during a certain period of time; during another period of time, the first UE 110 may wirelessly communicate with the second network node 119 via a channel including a plurality of radio channels.

When a UE has Multi-SIMs, the UE may be called as a Multi-SIM device. The UE with Multi-SIMs may register at the more than one networks. For example, a first SIM (USIM1) of the UE registers with a network A (the first network); and a second SIM (USIM2) of the UE registers with a network B (the second network). When the USIM1 is at a connected state with the network A, the UE need to have some coordination with the network A once the UE determines to do some work on the network B. In various embodiments, the "some work on the network B" may include some scenarios, for example but not limited to the following scenarios.

A first scenario may include periodic switching comprising at least one of paging reception or serving cell measurement. In one implementation, the scenario may include at least one of the following: synchronization signal block (SSB) detection, and/or a paging occasion (PO) reception.

A second scenario may include measurement for a cell reselection comprising at least one of an intra-frequency detection, an inter-frequency detection, or an inter-radio access technology (inter-RAT) detection. In one implementation, the scenario may include at least one of the following: a serving cell measurement, an intra-frequency cell detection, an intra-frequency cell measurement, an inter-frequency cell detection, an inter-frequency cell measurement, an inter-radio access technology (inter-RAT) cell detection, or an inter-RAT cell measurement.

A third scenario may include receiving system information block type 1 (SIB1) or a system information (SI) from at least one of a neighbor cell or a serving cell.

A fourth scenario may include at least one of an upper layer triggered control plane (CP) procedure, a mobile originated (MO) signaling, or a radio resource control (RRC) triggered CP procedure. In one implementation, the upper layer triggered CP procedure comprises a registration procedure, the MO signaling comprises a short message service (SMS), or the RRC triggered CP procedure comprises a routing area update (RAU).

A fifth scenario may include radio access network/core network (RAN/CN) paging response. In one implementation, the RAN/CN paging response comprises a busy indication.

A sixth scenario may include MO data/call service.

The present disclosure describes various embodiments for coordinating leaving procedures for at least one scenario, including but not limited to the scenarios as discussed above. The present disclosure describes methods, systems, and storage medium of classifying the at least one scenario into different leaving types and performing the detailed leaving procedure for the different leaving types.

Figure 2:
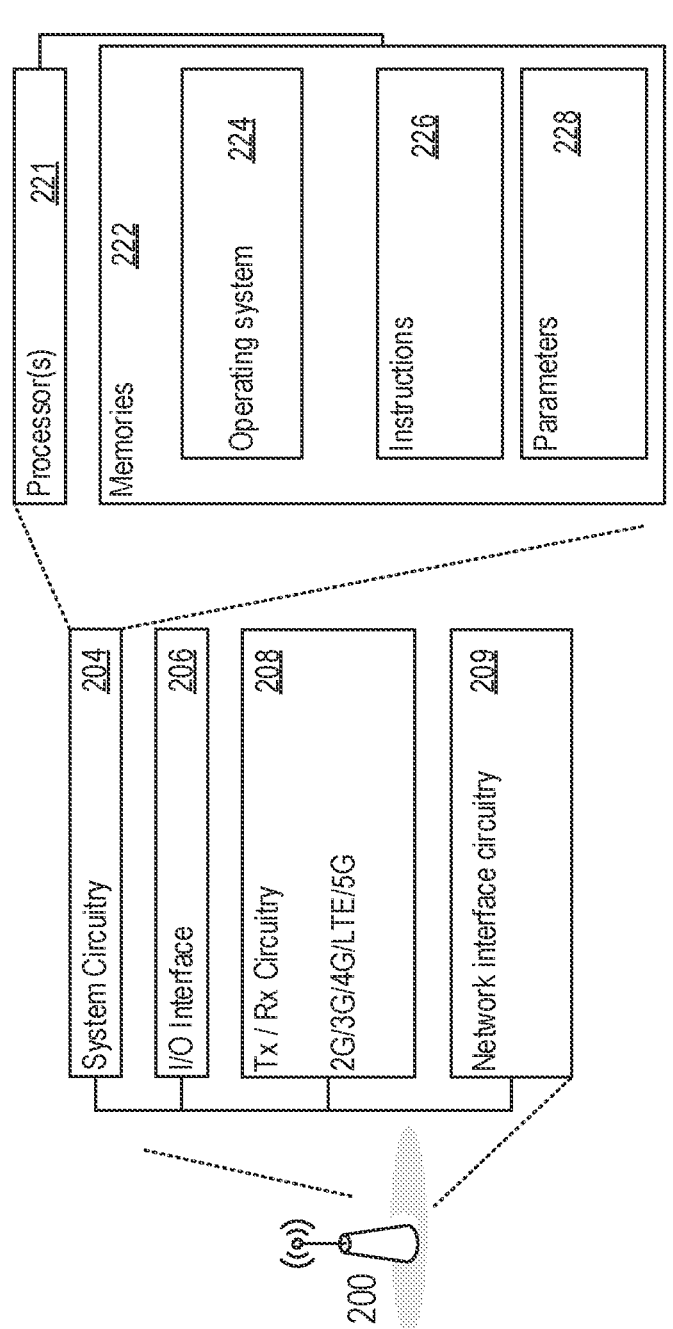
FIG. 2 shows an example of a network node.

FIG. 2 shows an example of electronic device 200 to implement a network node or network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 221 to perform the functions of the network node. The parameters 228 may include parameters to support execution of the instructions 226. For example, parameters may include network protocol settings, bandwidth parameters, radio frequency mapping assignments, and/or other parameters.

Figure 3:
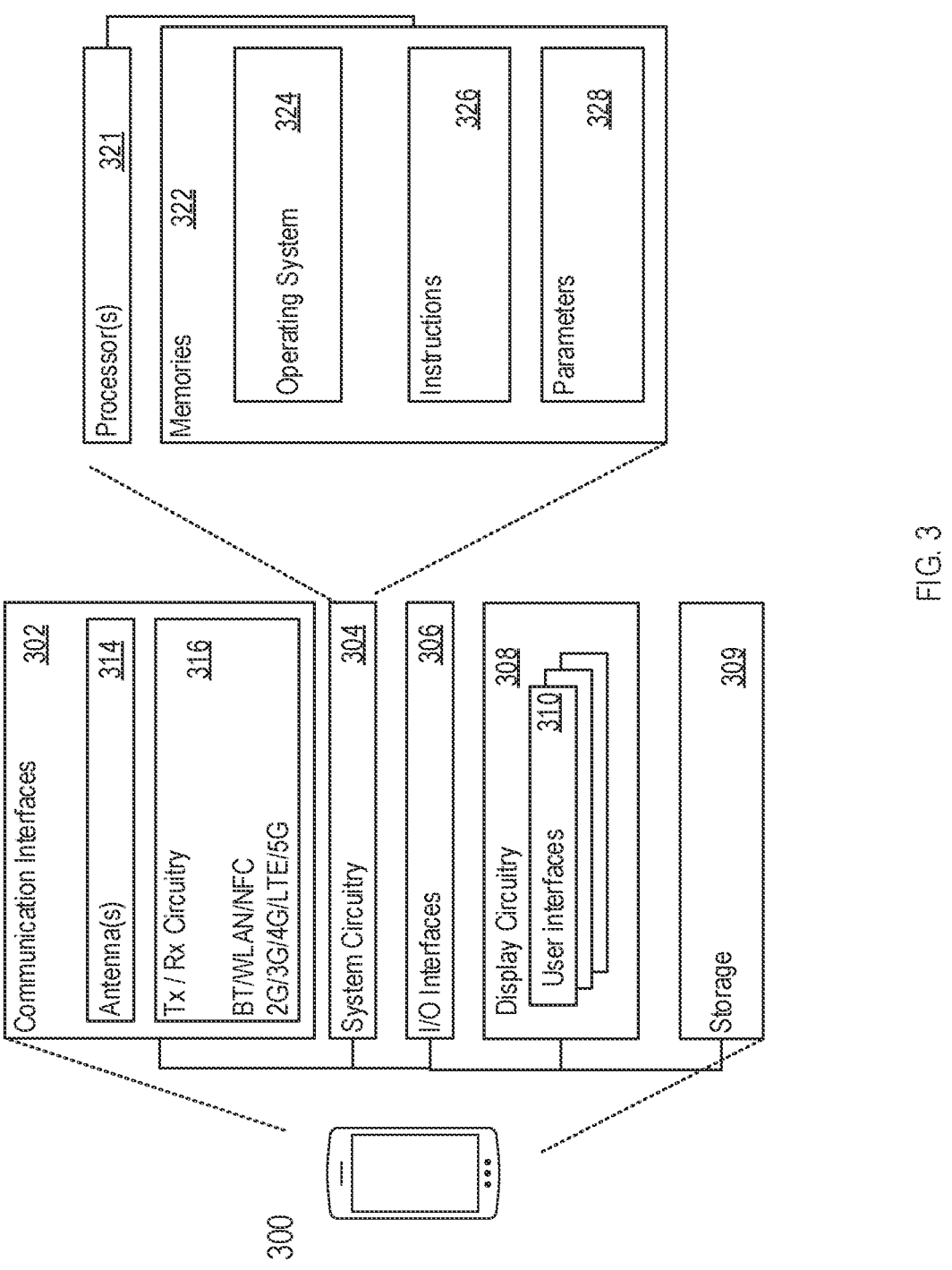
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, BLUETOOTH™ connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above in FIGS. 2-3.

Figure 4:
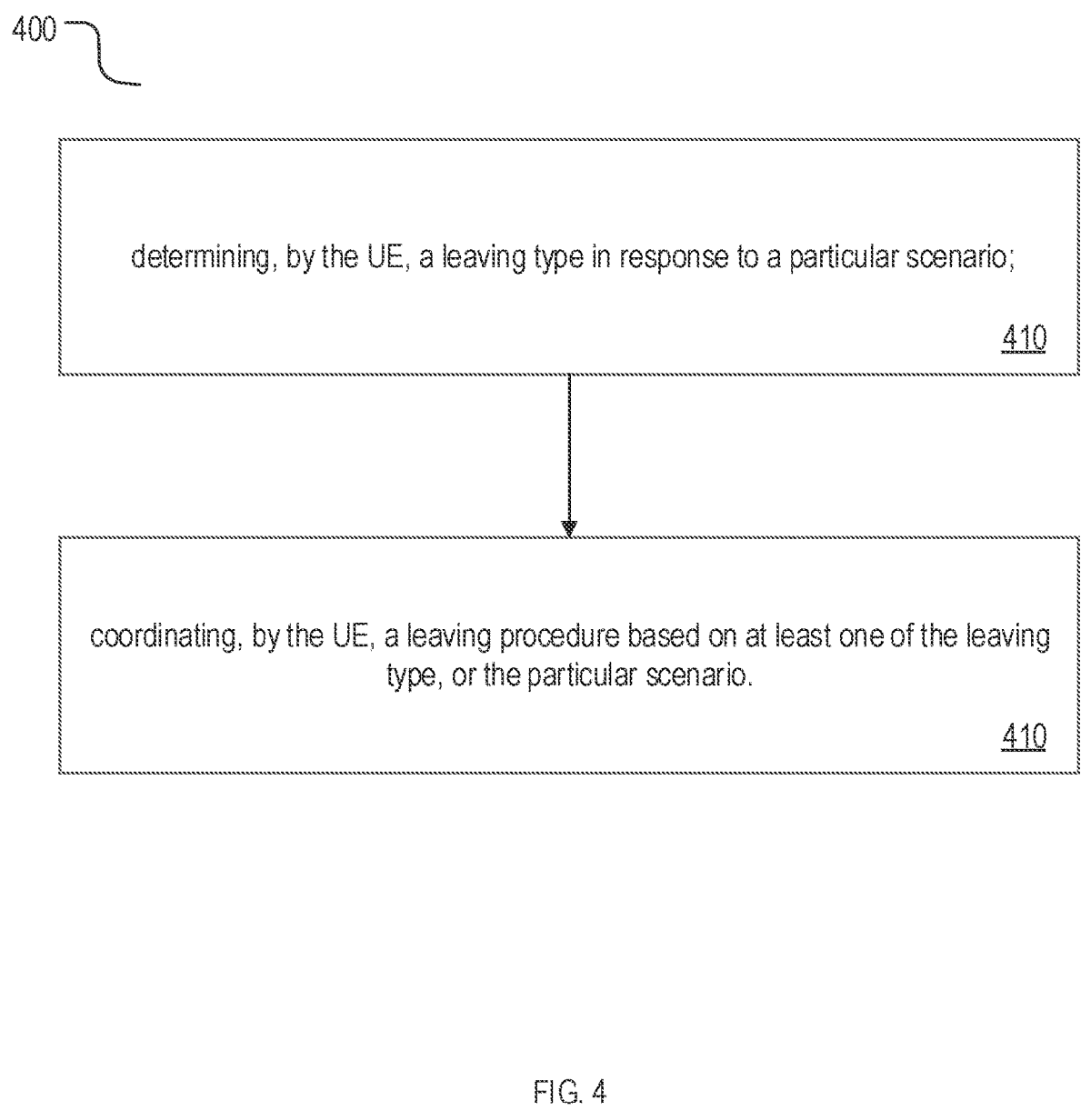

Referring to FIG. 4, the present disclosure describes embodiments of a method 400 for configuring, by a user equipment (UE), a leaving procedure for multiple networks. The method 400 may include a portion or all of the following steps: step 410: determining, by the UE, a leaving type in response to a particular scenario; and step 420: coordinating, by the UE, a leaving procedure based on at least one of the leaving type, or the particular scenario.

Figure 5:
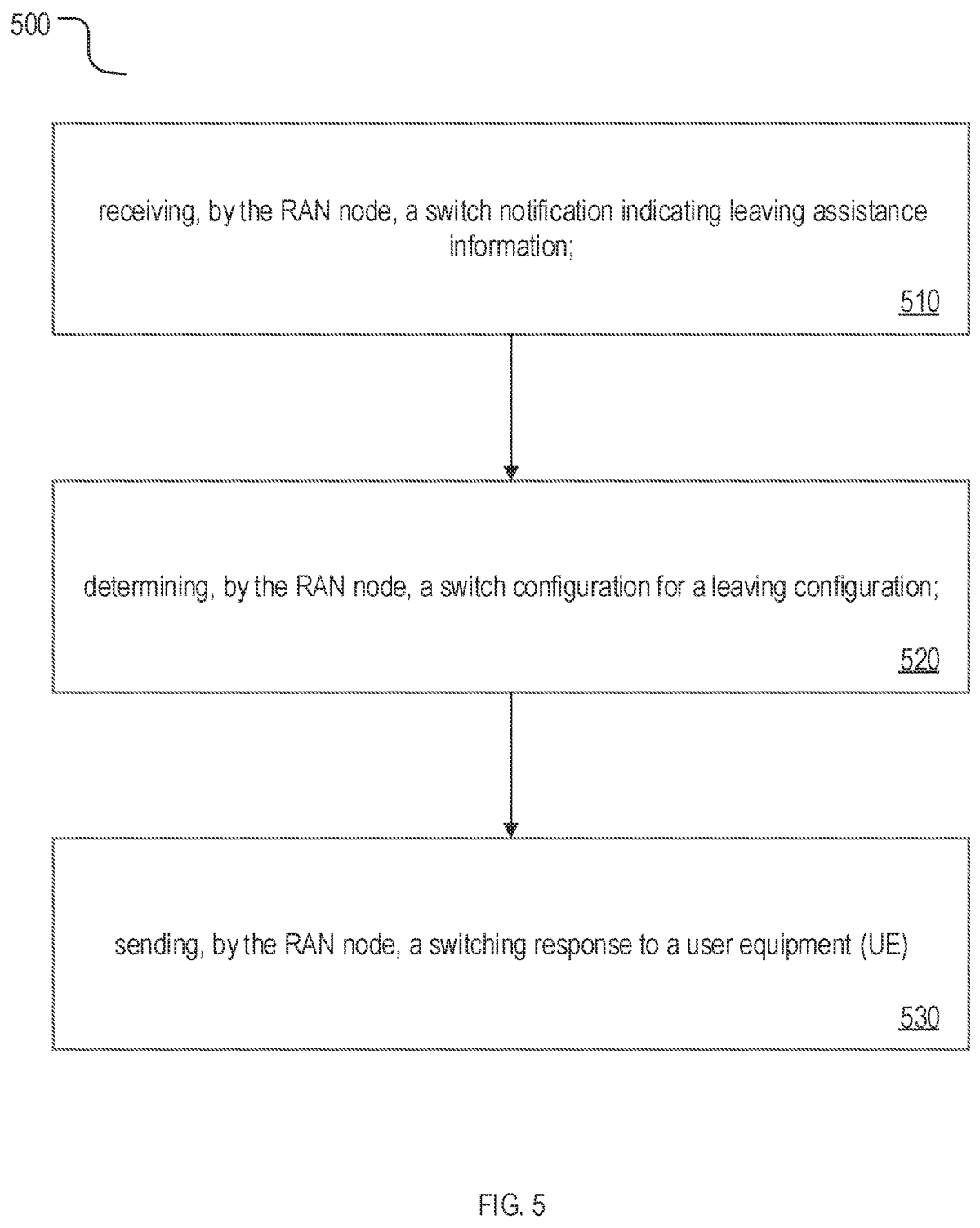

Referring to FIG. 5, the present disclosure describes embodiments of a method 500 for configuring, by a radio access network (RAN) node, a leaving procedure. The method 500 may include a portion or all of the following steps: step 510: receiving, by the RAN node, a switch notification indicating leaving assistance information; step 520: determining, by the RAN node, a switch configuration for a leaving configuration; and step 530: sending, by the RAN node, a switching response to a user equipment (UE).

Figure 6:
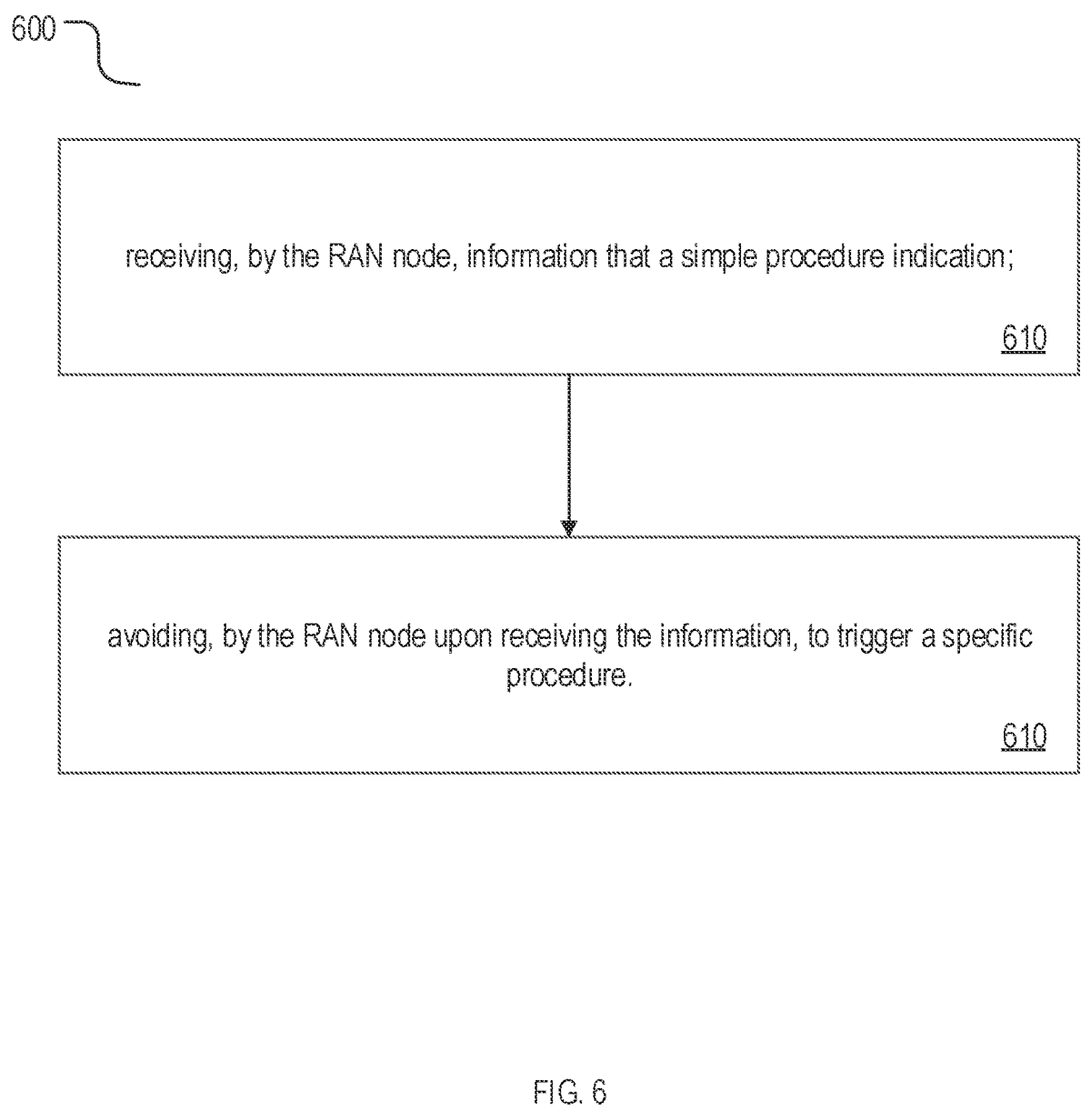

Referring to FIG. 6, the present disclosure describes embodiments of a method 600 for configuring, by a radio access network (RAN) node, a leaving procedure. The method 600 may include a portion or all of the following steps: step 610: receiving, by the RAN node, information that a simple procedure indication; and step 620: avoiding, by the RAN node upon receiving the information, to trigger a specific procedure.

In various embodiments, the UE registers with the multiple networks by at least one of the following: registering the multiple networks with multiple subscriber identity modules (Multi-SIMs); or registering the multiple networks with a subscriber identity module (SIM).

In various embodiments, the multiple networks comprises at least one of the following: multiple radio access networks (RANs) comprising a first RAN and a second RAN; multiple core networks (CNs) comprising a first CN and a second CN; or a RAN and a CN.

In various embodiments, the leaving type may comprises one of the two types: a long leaving type and a short leaving type. In one implementation, for a long leaving type, the UE may enter into an idle/inactive state in a network A (a first network) and enter into a connected state in a network B (a second network); for a short leaving type, the UE may keep at the connected state. In another implementation, the short leaving type may include a periodic leaving type and a one-shot leaving type.

In various embodiments, the leaving type includes at least one of the following: a long leaving type for a switching notification procedure transferring the UE to an idle or inactive state with the first RAN; a periodic leaving type for a switching notification procedure keeping the UE in a RRC_CONNECTED with the first RAN; a one-short leaving type for a switching notification procedure keeping the UE in a RRC_CONNECTED with the first RAN.

In various embodiments, a cause may be added to indicate Multi-SIMs or multiple networks connection between at least one of the following: the UE and the first RAN; the UE and a core network (CN) node; the first RAN and the CN node; the second RAN and the CN node; or the first RAN and the second RAN.

Determining Leaving Types

In various embodiments, the first, second, third, and fifth scenarios discussed above may be determined as the short leaving type; the sixth scenario may be determined as the long leaving type. The fourth scenario may be determined as long leaving or short leaving type depending on other factors.

In one implementation, the second network may not specify the situations in the fourth scenario as long-leaving trigger condition, so it's left to the UE to implement whether to be a long leaving type or a short leaving type.

In another implementation, the second network may specify a portion or all of the situations in the fourth scenario as the long-leaving type or short leaving type, for example, as a short one-shot leaving trigger condition.

For the triggering events in the fourth scenario, the time delay may be different. For example but not limited to, the registration procedure may be triggered by parameters change, or by moving to a new tracking area identity (TAI). For the parameters change, the registration procedure may not involve access and mobility management function (AMF) change, but for moving to a new TAI, the AMF change may be involved. Furthermore, it may also be determined by the ongoing serving type, for the case that there are only non-guaranteed bit rate (non-GBR) bearer, the UE may adopt long-leaving procedure, otherwise, adopt short leaving procedure to keep the connection as much as possible.

Figure 7:
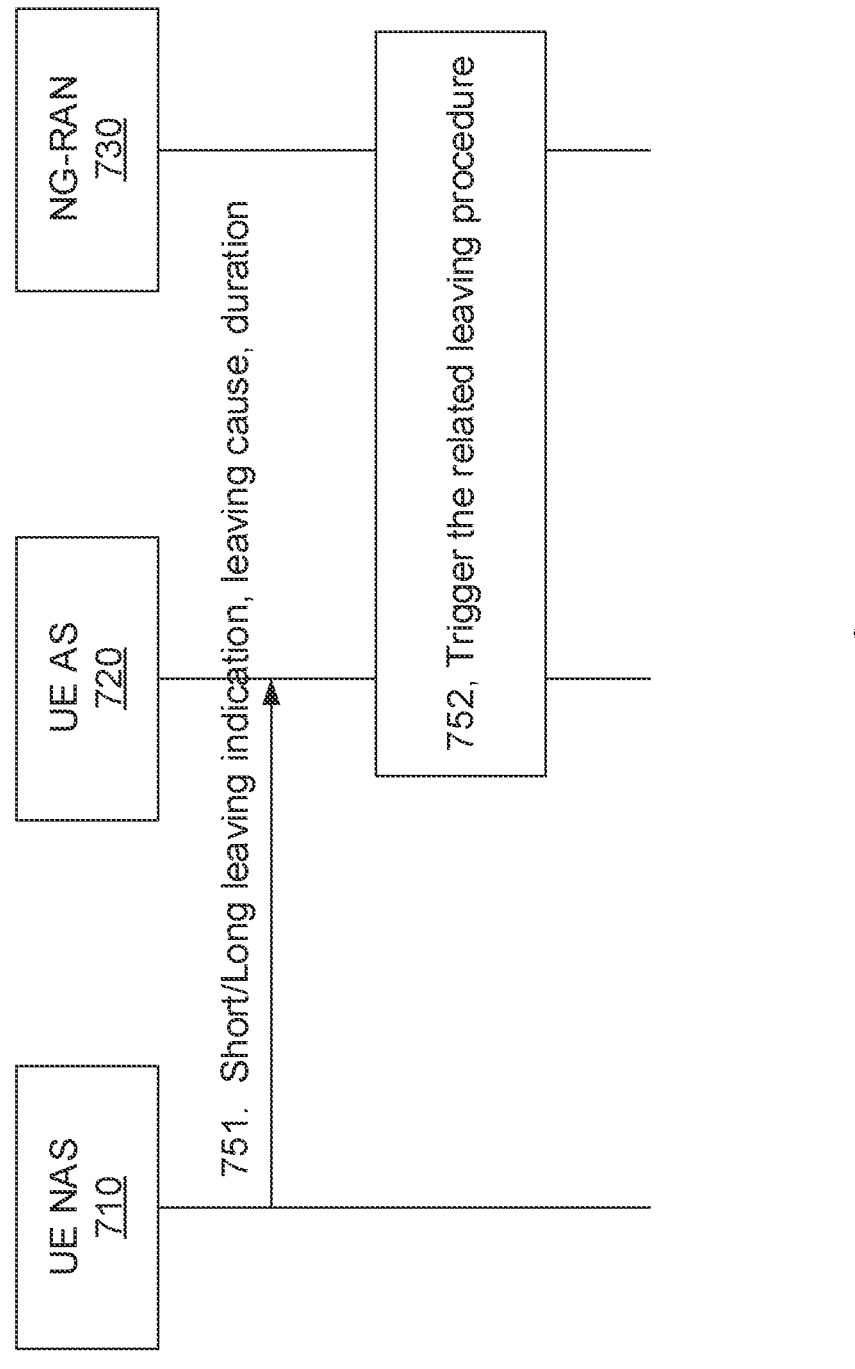
FIG. 7 shows a schematic diagram of an exemplary embodiment for wireless communication.

In various embodiments as shown in FIG. 7, for the upper layer (e.g., UE NAS layer 710) triggered CP plane procedure, e.g., registration, other MO signaling e.g., SMS, in the fourth scenario, the upper layer may determine the leaving types and indicate the UE lower layer (e.g., UE AS 720) leaving types in step 751. In one implementation, the UE upper layer may also indicate the trigger reasons, and/or expected time duration. In another implementation, the UE lower layer may trigger the leaving procedure according to the upper layer indication in step 752.

Long Leaving Type Procedure

In various embodiments, a long-time switching procedure for a long leaving type may be used for the switching notification procedure which moves the UE to an idle or an inactive state in a network A (a first network), after sending switching notification to the network A. In one implementation, an idle or an inactive state may be indicated with RRC_IDLE or RRC_INACTIVE.

In various embodiments, some assistance information for the mobile terminated (MT) restriction may include at least one of the following: information to temporarily restrict/filter MT data/signaling handling; an indication that the UE should only be paged for voice (MMTel voice or CS domain voice (for EPS)), an indication that the UE should not be paged at all, or packet data network (PDN) connection(s) for a MT notification/paging restriction.

For the long leaving, the UE may into an idle/inactive state, this assistance information shall be send to the network, so it's better to adopt a NAS signaling for the long leaving procedure.

Figure 8:
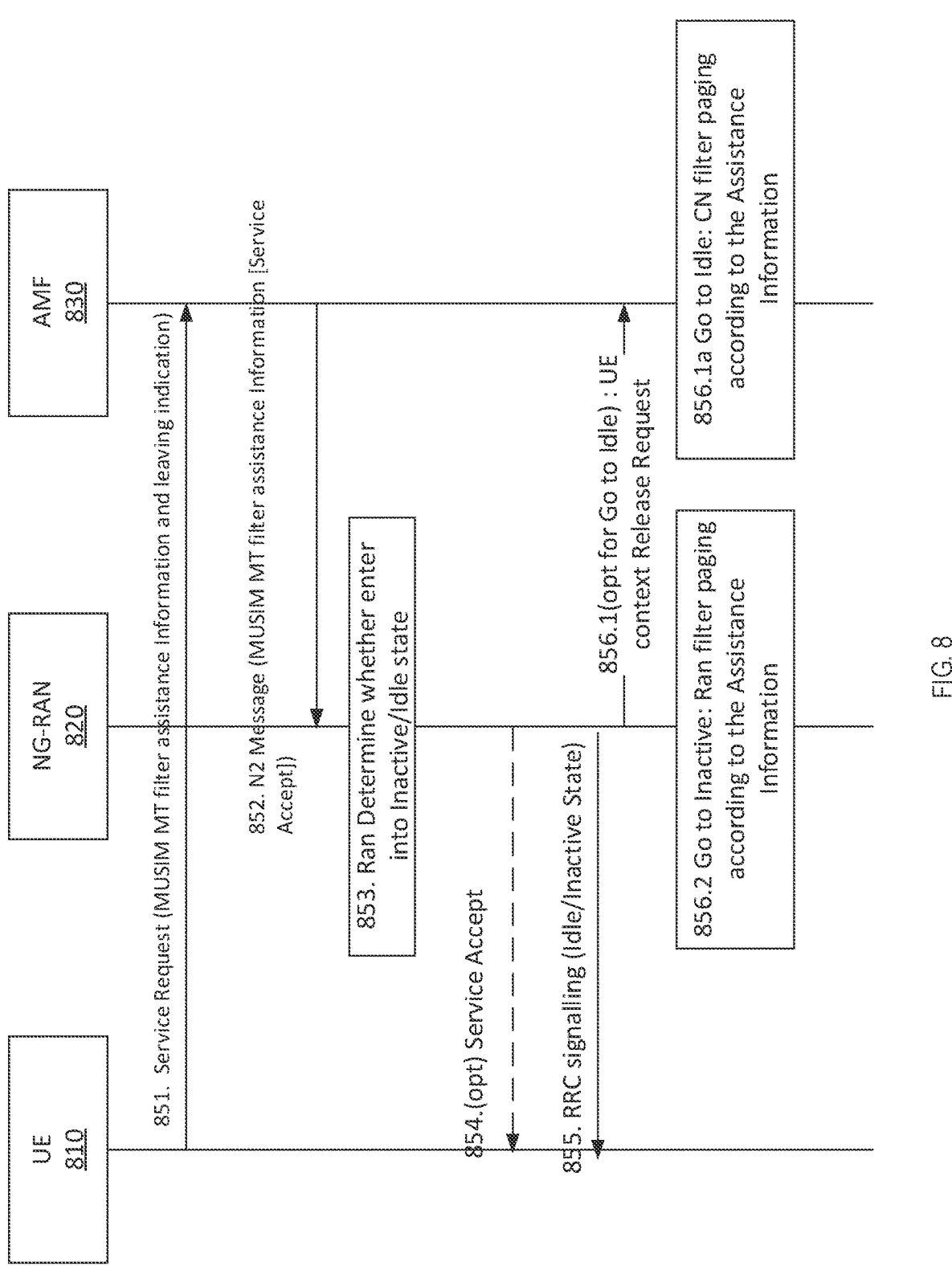
FIG. 8 shows a schematic diagram of an exemplary embodiment for wireless communication.

FIG. 8 shows an example of NAS signaling based long-leaving procedure. Referring to step 851, the UE 810 sends a service request, for example, including MUSIM MT filter assistance information and leaving indication, to the AMF 830. In step 852, the AMF sends a N2 Message, including MUSIM MT filter assistance information indicating service accept to the NG-RAN 820. In step 853, the NG-RAN determines whether to enter into the inactive/idle state. Optionally in step 854, the NG-RAN indicates to the UE that service accept. In step 855, the NG-RAN sends a radio resource control (RRC) signaling to indicate the idle/inactive state to the UE. Optionally in step 856.1, the NG-RAN sends UE context release request to the AMF. In step 856.2, the NG-RAN goes to inactive and RAN filter paging according to the assistance information. In step 856.1a, the AMF goes to idle and the CN filter paging according to the assistance information.

The other issue is about whether the UE need to indicate the preferred state. If the NAS signaling would be adopted, the network may distinguish the long leaving from the short leaving, and it shall left to the network to determine an Idle/Inactive state, thus there is no need to indicate the preferred state.

Figure 9:
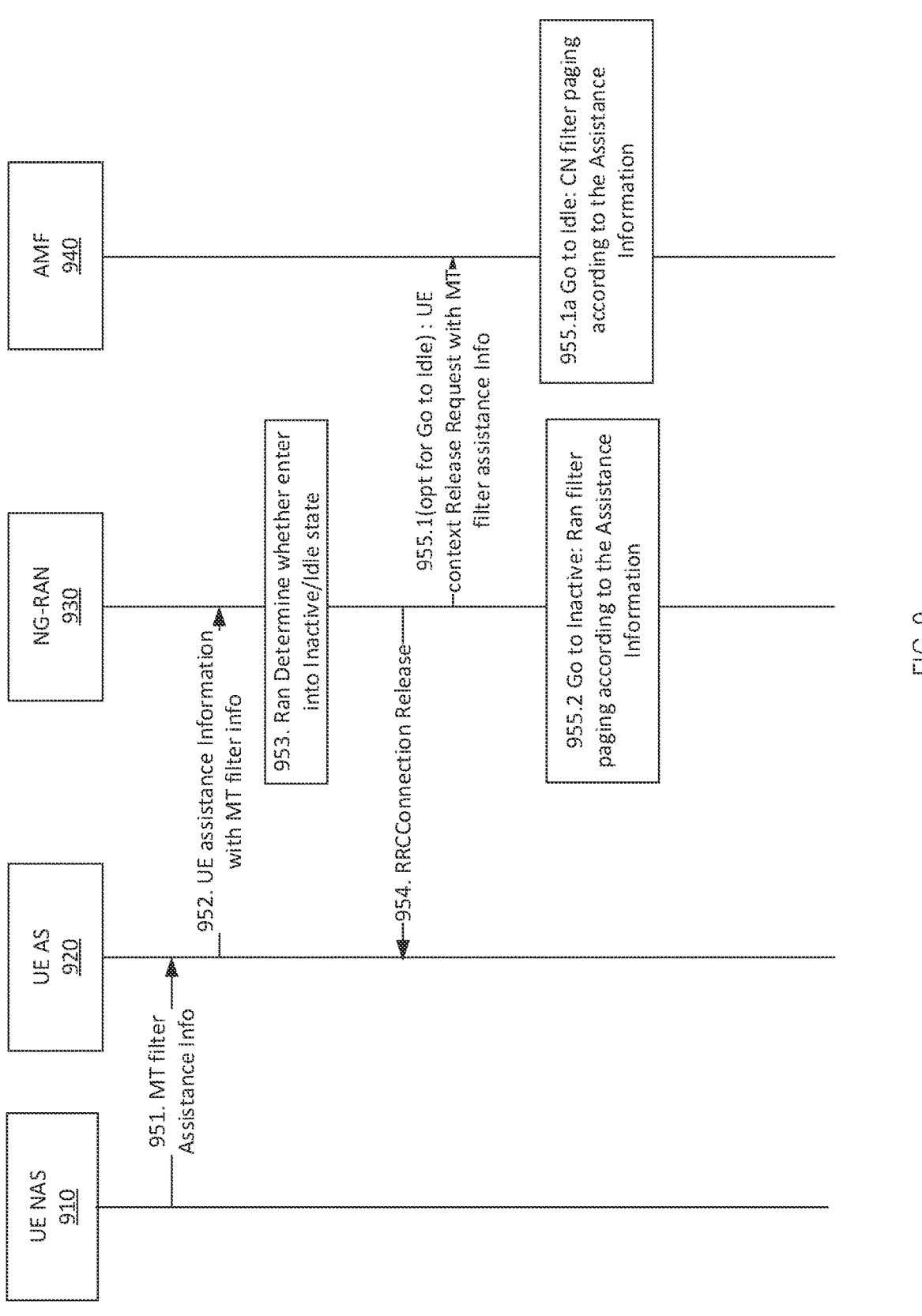
FIG. 9 shows a schematic diagram of an exemplary embodiment for wireless communication.

FIG. 9 shows an example of AS signaling based long-leaving procedure. Referring to step 951, the UE NAS 910 sends a MT filter assistance information to the UE AS 920. In step 952, the UE AS sends the UE assistance information with MT filter information to the NG-RAN 930. In step 953, the NG-RAN determines whether to enter into an inactive/idle state. In step 954, the NG-RAN sends RRCConnection release to the UE AS. In step 955.1, the NG-RAN sends UE context release request with MT filter assistance information to the AMF 940. In step 955.2, the NG-RAN goes to inactive with RAN filter paging according to the assistance information. In step 955.1a, the AMF goes to idle with CN filter paging according to the assistance information.

Short Leaving Types: Periodic Short Leaving and One-Shot Short Leaving

In various embodiments, the short leaving type may include a periodic leaving type and a one-shot leaving type. In one implementation, a periodic leaving type includes a switching notification procedure keeping the UE in a RRC_CONNECTED with the first network; and a one-short leaving type includes a switching notification procedure keeping the UE in a RRC_CONNECTED with the first network. In another implementation, the short-time switching procedure may be used for the switching notification procedure which keeps the UE in RRC_CONNECTED in a network A (a first network) after sending switching notification to network A.

In various embodiments, the third, fourth, and fifth scenarios discussed above may be determined to belong to the one-short leaving type, and the paging detection in the first scenario may be determined to belong to the periodic leaving type.

In one implementation, for the serving cell measurement in the first scenario, the UE may measure the SS-RSRP and SS-RSRQ level of the serving cell and evaluate the cell selection criterion S for the serving cell at least once every M1*N1 DRX cycle; where M1=2 if SMTC periodicity (TSMTC)>20 millisecond (ms) and DRX cycle≤0.64 second, otherwise M1=1.

In another implementation, the UE may filter the SS-RSRP and SS-RSRQ measurements of the serving cell using at least 2 measurements. Within the set of measurements used for the filtering, at least two measurements shall be spaced by, at least DRX cycle/2.

In another implementation, the measurement for the serving cell may also be seen as periodic events, thus the periodic leaving is also needed. Thus, the measurement for the serving cell in the first scenarios may be seen as periodic events and the periodic leaving may be also needed.

In various embodiment, the second scenario discussed above may be determined to belong to the periodic or one short leaving type. According to the reselection requirement, it may have periodic attributes. For example, for the intra-frequency reselection, once the serving cell fulfils Srxlev≤ $S_{IntraSearchP}$ or Squal≤$S_{IntraSearch}$, the UE may perform intra-frequency measurements according to the requirements as the following: the UE may be able to evaluate whether a newly detectable intra-frequency cell meets a reselection criteria within $T_{detect,NR\_Intra}$ when that Treselection=0. The UE may measure SS-RSRP and SS-RSRQ at least every $T_{measure,NR\_Intra}$ (see Table 1) for intra-frequency cells that are identified and measured according to the measurement rules.

TABLE 1

| DRX cycle length [s] | Scaling Factor (N1) | | $T_{detect, NR\_Intra}$ [s] (number of DRX cycles) | $T_{measure, NR\_Intra}$ [s] (number of DRX cycles) | $T_{evaluate, NR\_Intra}$ [s] (number of DRX cycles) |
|---|---|---|---|---|---|
| | FR1 | FR2[Note1] | | | |
| 0.32 | 1 | 8 | 11.52 × N1 × M2 (36 × N1 × M2) | 1.28 × N1 × M2 (4 × N1 × M2) | 5.12 × N1 × M2 (16 × N1 × M2) |
| 0.64 | | 5 | 17.92 × N1 (28 × N1) | 1.28 × N1 (2 × N1) | 5.12 × N1 (8 × N1) |
| 1.28 | | 4 | 32 × N1 (25 × N1) | 1.28 × N1 (1 × N1) | 6.4 × N1 (5 × N1) |
| 2.56 | | 3 | 58.88 × N1 (23 × N1) | 2.56 × N1 (1 × N1) | 7.68 × N1 (3 × N1) |

Note1

Applies for UE supporting power class 2&3&4. For UE supporting power class 1, N1 = 8 for all DRX cycle length.
Note 2:
M2 = 1.5 if SMTC periodicity of measured intra-frequency cell >20 ms; otherwise M2 = 1.

Based on Table 1, for the intra frequency measurement, during the DRX cycle, the UE may detect the SSB to sync up first then detect paging, after paging detection, the UE may execute detection or the measurement or both of them. The detection/measurement Gap maybe contiguous or non-contiguous with PO, for that it depends on the SMTC of the intra-frequency.

Figure 10:
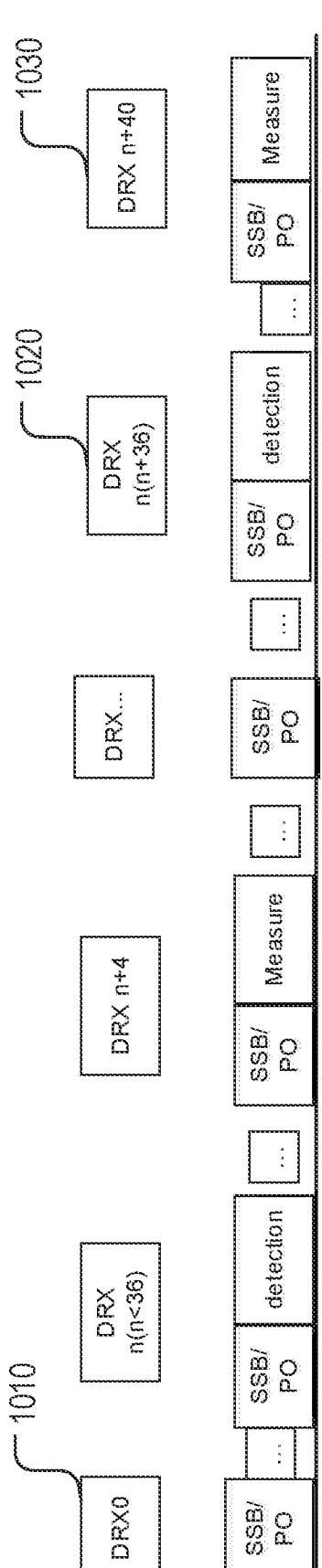
FIG. 10 shows a schematic diagram of an exemplary embodiment for wireless communication.

FIG. 10 shows one example for a periodic gap pattern. For example but not limited to, DRX cycle may be taken as 0.32 second for the FR1, the UE may need the Gap as below: T1=DRX cycle with Length=SSB detection (optional)+PO (1010); T2=36 DRX cycle with Length=SSB detection (optional)+PO+intra-frequency detection (1020); and T3=4DRX cycle with Length=SSB detection (optional)+PO+measurement (1030).

In one implementation, the one or more gap pattern may include at least one set of a reference sub-carrier spacing (SCS), a gap start time, a gap repetition period, a duration, one or more gap purposes for at least one gap pattern. The duration of the gap may include at least one of the following: a number of Ts; or a number of symbols. The reference SCS may be indicated implicitly by using a SCS of an initial bandwidth part (BWP) of the first network.

In various embodiments, the measurements of the inter frequency and inter RAT may be similar to the infra-frequency, the detection/measurement may also require the periodic Gap. In one implementation, the detection/measurement for the intra-frequency, inter frequency and inter-Rat may also require periodic gap.

In various embodiments, it may also belong to the UE implementation. When taking the measurement for the cell reselection as one short event, the UE may need to coordinate leaving with the network A frequently, which will affect the performance of the network A seriously.

In various embodiments, the UE may indicates the one or more gap patterns with one or more purposes to the network. In one implementation, the purposes may include at least one of the following: SSB detection, PO detection, serving cell measurement, intra-frequency cell detection, intra-frequency cell measurement, inter-frequency cell detection, inter-frequency cell measurement, inter-RAT cell detection and inter-RAT cell measurement.

In various embodiments, the network may receive one or more gap patterns with one or more purposes from the UE. In one implementation, the purposes may include at least one of the following: SSB detection, PO detection, serving cell measurement, intra-frequency cell detection, intra-fre-quency cell measurement, inter-frequency cell detection, inter-frequency cell measurement, inter-RAT cell detection and inter-RAT cell measurement. In another implementation, the network determine the gap reservation or not according to the purposes.

Periodic Short Leaving Type (or Periodic Leaving Type)

Figure 11:
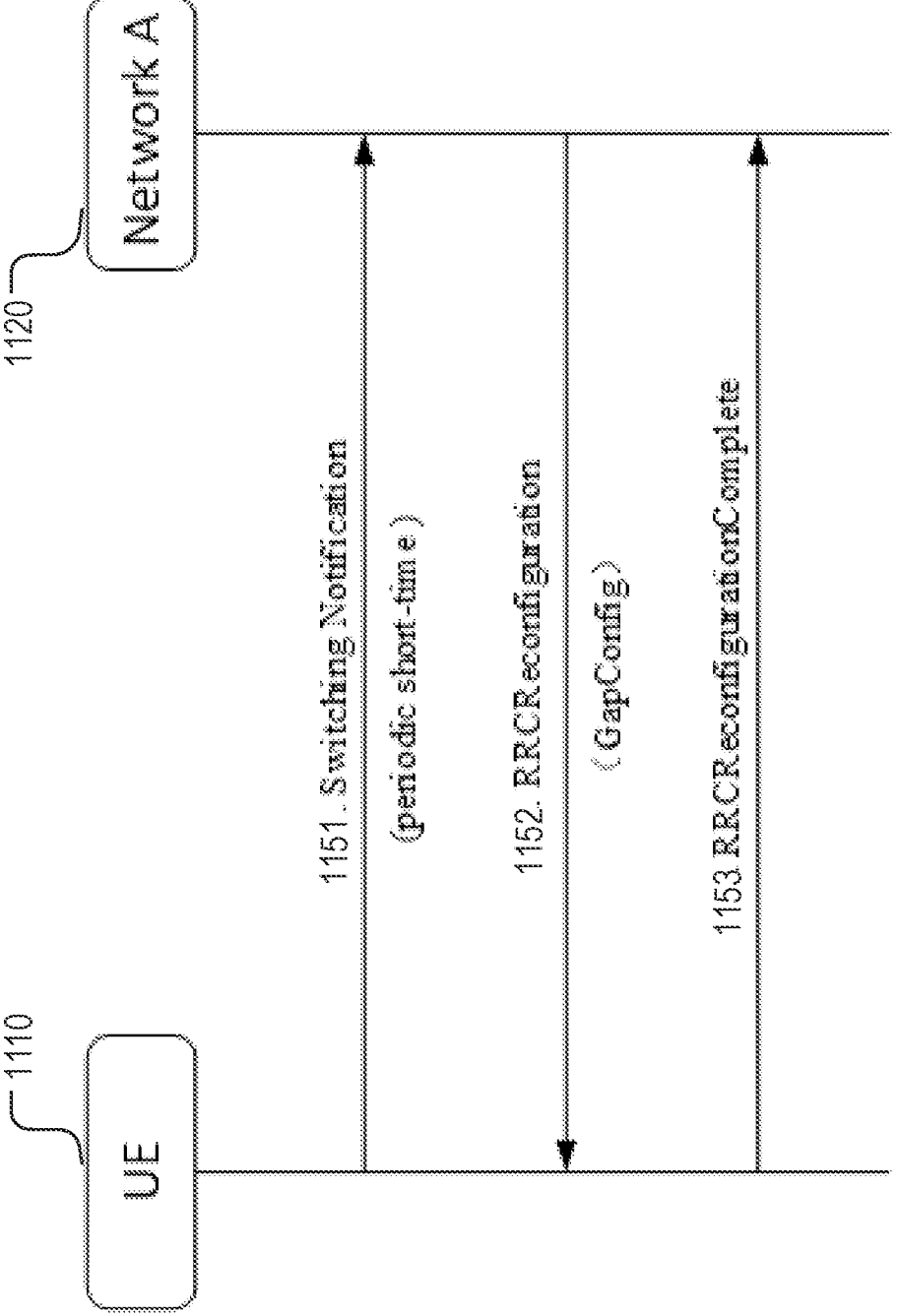
FIG. 11 shows a schematic diagram of an exemplary embodiment for wireless communication.

FIG. 11 shows one example of the periodic leaving procedure. In step 1151, a UE 1110 sends a switching notification to a Network A (a first network, 1120) indicating a periodic short time. In step 1152, the network A sends a RRCReconfiguration message to the UE. In step 1153, the UE sends a RRCReconfigurationComplete to the network A.

In various embodiments, for the first scenario discussed above including paging receiving and serving cell measurement, the parameters for the paging to indicate the gap may include at least one of the following: indication of need for gap, for example, UE may need for gap, or disable the need for gap (e.g., if the other SIM is disabled); gap pattern request, e.g., gap start time, gap repetition period, etc.; and/or gap length.

In one implementation, the gap length may be calculated with number of Ts or symbols. When the number of symbols is used, the SCS of initial BWP of the Network A may be adopted.

Figure 12:
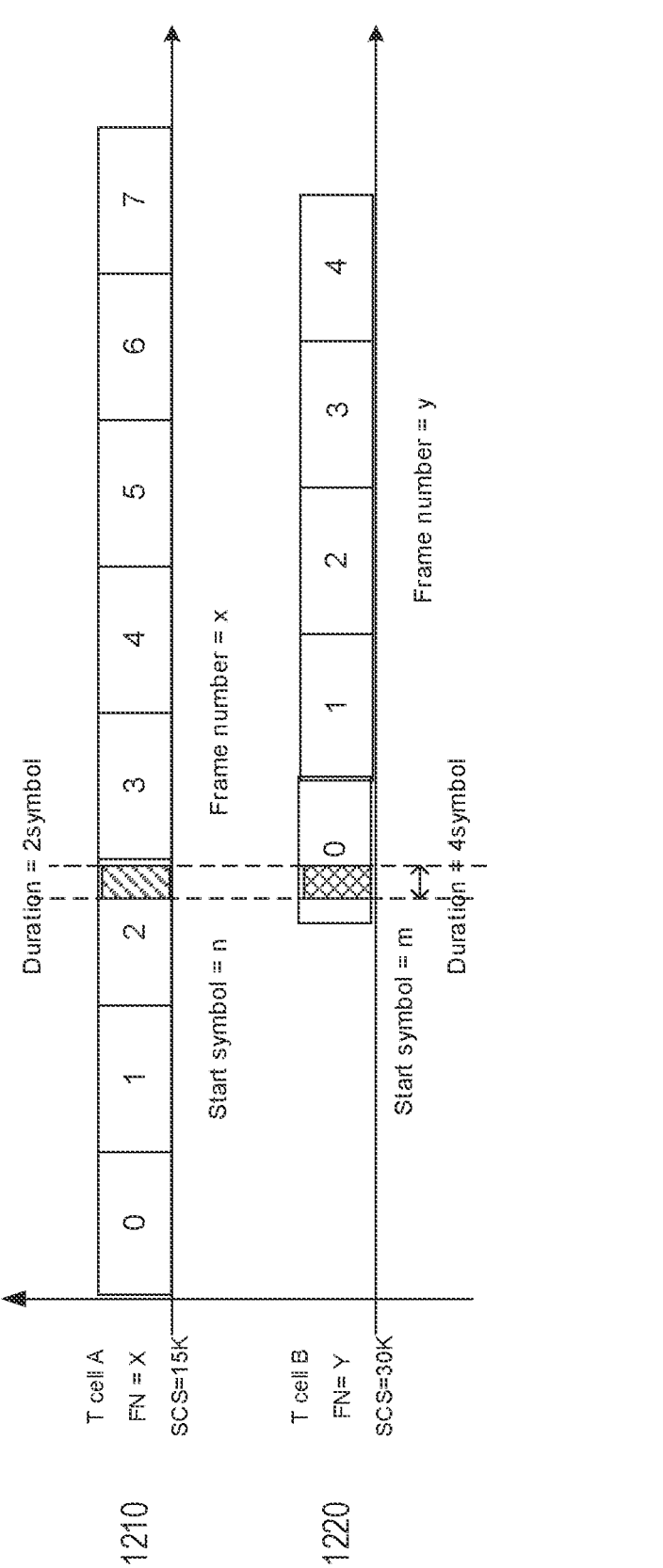
FIG. 12 shows a schematic diagram of an exemplary embodiment for wireless communication.

FIG. 12 shows one example of the periodic gap duration. The UE may map the periodic gap pattern of the network B (a second network 1220) to a network A (a first network 1210). For example, a parameter set with (start FN, SFN, Symbol, duration) may be (x, 2, n, 2) rather than (y, 0, m, 4).

In various embodiments, for each gap pattern, the UE may indicate the duration of the gap, gap start time, gap repetition period, the reference SCS. In one implementation, the duration of the gap may be a number of Ts or a number of symbols. In another implementation, for the number of symbols, the SCS of initial BWP of the current network may be taken as the reference SCS. In another implementation, the current network may refer to the network that the UE will send the gap information to.

In various embodiments, the network may receive the duration of each gap, and determine the scheduling based on the duration and SCS of initial BWP or the reference SCS indicated by the UE.

For example, the Asn.1 coding for the one or more gap patterns with one or more purposes may be expressed as below.

```
UEAssistanceInformation ::=          SEQUENCE {
    periodicGapPatternList           SEQUENCE (SIZE (1.. maxGapPattern)) OF
periodicGapPattern
}
periodicGapPattern ::=       SEQUENCE {
purpose                      ENUMERATED { SSBdetection, POdetection, Servingcell
                                 meas, intra-freqdetect, intra-frequencymeas, inter-
                                 freqdetect, inter-freqmeas, inter-RATdetect and
                                 inter-RATmeas}
    gapPattern               GapPattern;
}
GapPattern::=    SEQUENCE {
    startSFN                        INTEGER (0..9),
    startFN                         INTEGER (0..1023)
subcarrierSpacing            ENUMERATED {kHz15, kHz30, kHz60, kHz120, kHz240,
                                 spare3, spare2, spare 1}
    startSymbol                 INTEGER (0..13),
    Duration                    INTEGER (1..maxValue),
    period                          ENUMERATED {rf32, rf64, rf128, rf256}
    }
```

Wherein, startSFN may refer to the Start sub-frame number of the periodic Gap, which is based on the timing of the cell that will reserve the periodic Gap; startFN may refer to the start Frame Number of the Gap, which is based on the timing of the cell that will reserve the periodic Gap; subcarrierSpacing may refer to the reference SCS of the periodic Gap, if not included, the SCS of the initial BWP of the cell that will reserve the periodic Gap would be taken as the reference SCS; startSymbol may refer to the start symbol of the periodical Gap, which is based on the timing of the cell that will reserve the periodic Gap; Duration may refer to the duration in symbols of the periodic Gap; Period may refer to the period of the periodic Gap.

One-Shot Leaving Type

In various embodiments, the second, third, fourth, and fifth scenarios discussed above may trigger the one-shot leaving type procedure.

Figure 13:
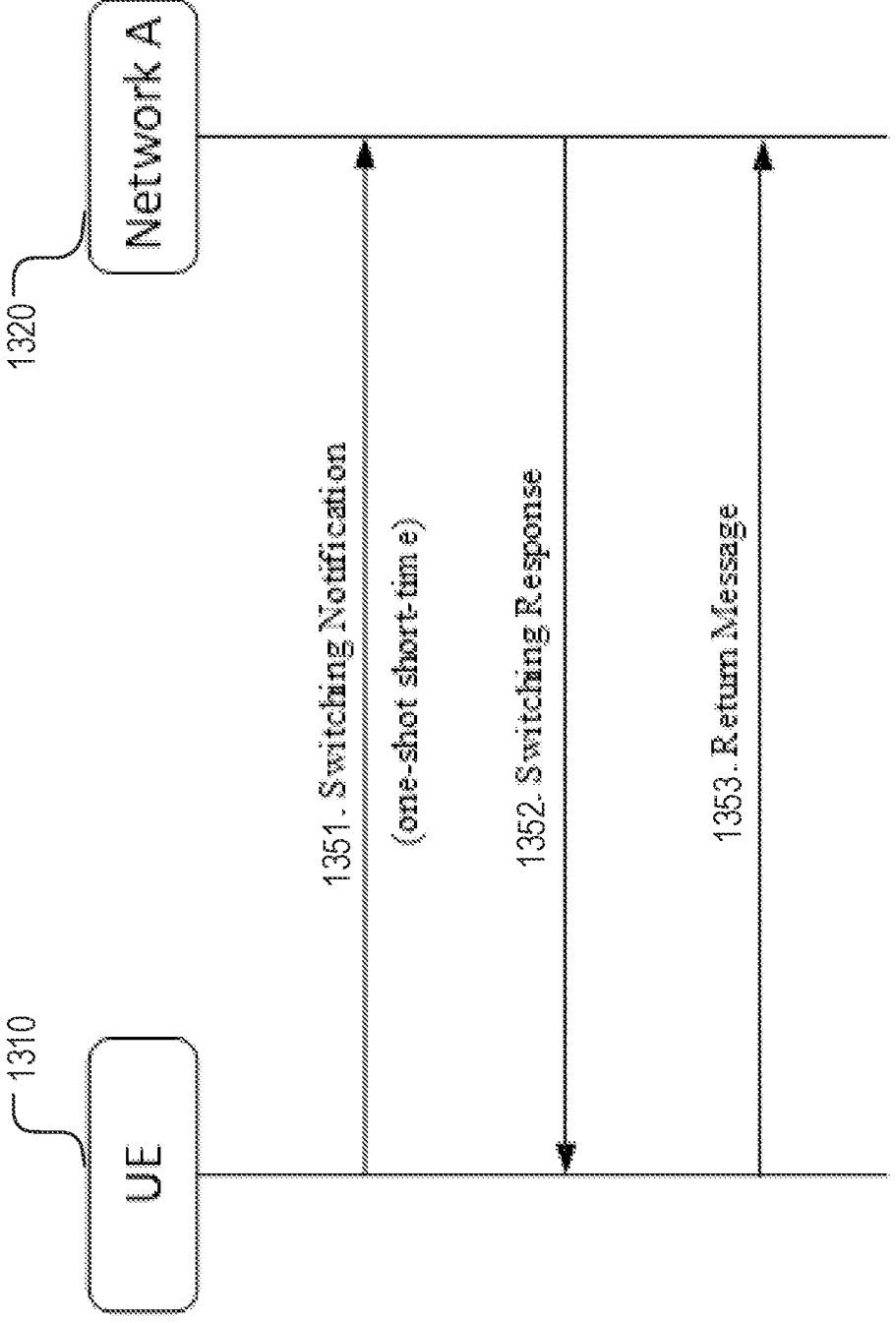
FIG. 13 shows a schematic diagram of an exemplary embodiment for wireless communication.

FIG. 13 shows one example of the one-shot leaving procedure. In step 1351, a UE 1310 sends a switching notification to a network A (a first network, 1320) indicating a one-shot short time. In step 1352, the network A sends a switching response to the UE. In step 1353, the UE sends a return message to the network A.

In one implementation, the switching response comprises a RRC signaling with a gap mode.

In another implementation, the gap mode comprises at least one of the following: a long scheduling gap; a gap with a time division multiplexing (TDM) pattern; or an autonomous gap.

In another implementation, in response to the gap mode being configured as a long scheduling gap: a gap duration equals to a leaving duration; and the UE avoids downlink (DL) and uplink (UL) receiving during the gap duration.

In another implementation, in response to the gap mode being determined as a gap with TDM pattern: the UE communicate with the second Ran a plurality of gaps periodically during a short leaving duration.

In another implementation, the UE indicate the Gap with TDM pattern to the second network.

In another implementation, the TDM pattern comprises at least one of the following: a bit map for one or more subframe; a bit map for one or more frame, or one or more indication for a start time, a duration, a period, a reference SCS.

In another implementation, in response to the gap mode being determined as an autonomous gap: during a gap duration, the UE determines communications with the first RAN or the second RAN.

In various embodiments, the UE receives information of the gap mode from the first RAN; and the UE leaves the first RAN based on the information of the gap mode. In one implementation, the UE use a timer to control the gap duration by at least one of the following: starting a timer when receiving the gap mode configuration; stopping the timer when a procedure with the second network finishes; or aborting the procedure on the second network and resuming back to the first RAN when the timer expires. In another implementation, a length of the timer equals to a gap duration configured in the gap mode.

Figure 14:
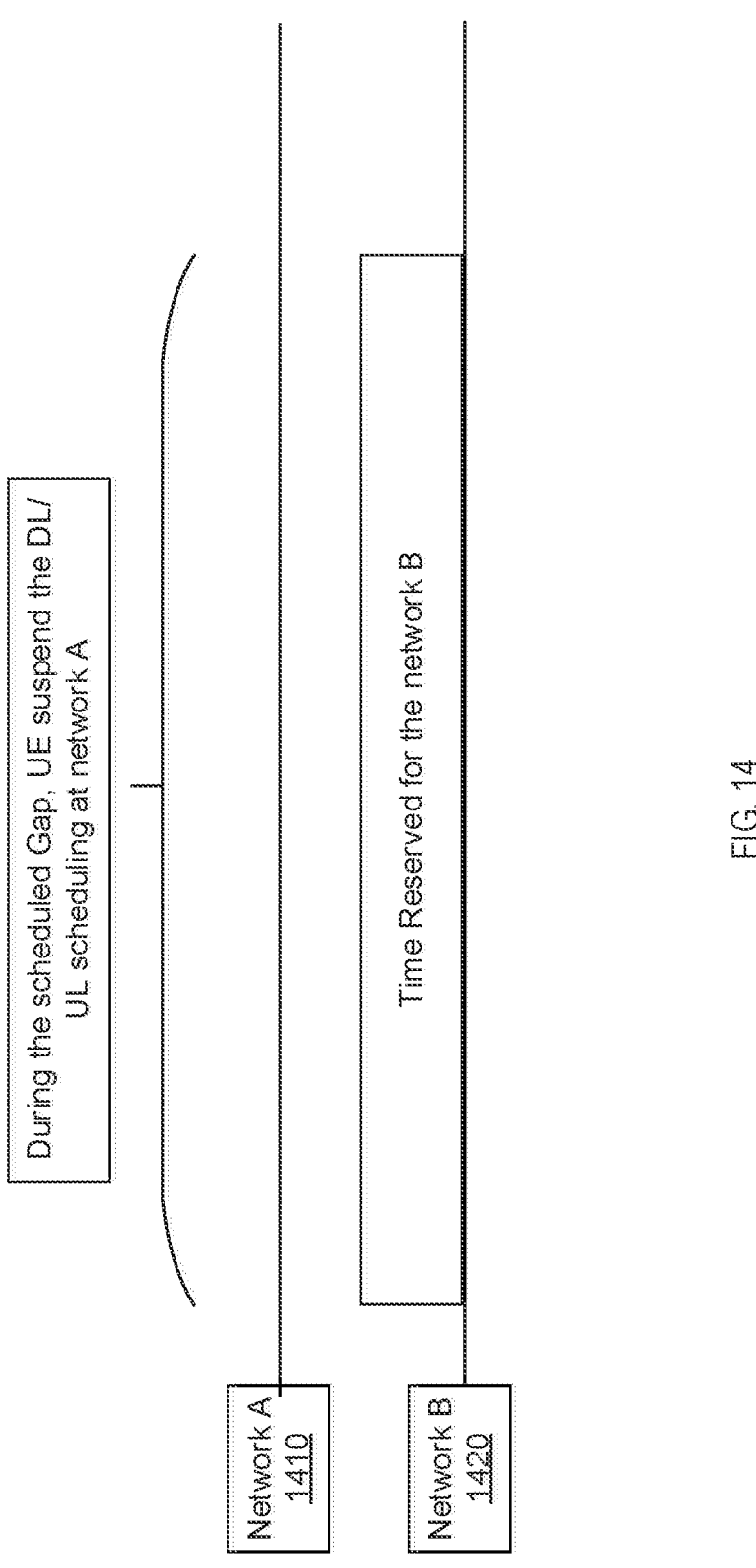
FIG. 14 shows a schematic diagram of an exemplary embodiment for wireless communication.

FIG. 14 shows an example for a long scheduling gap (or a long scheduled gap). Network A 1410 is a first network; and network B 1420 is the second network. The Gap length may equal to the short leaving duration, and during the Gap the network may avoid both DL and UL scheduling. In one implementation, for the dual-Rx UE, it may adopt the reduced Rx capability for the DL scheduling, for example, for the second and third scenarios as discussed above. This mode may affect the UE experience, considering that both the DL and UL can't be scheduled and that the one-shot procedure may take tens of milliseconds.

Figure 15:
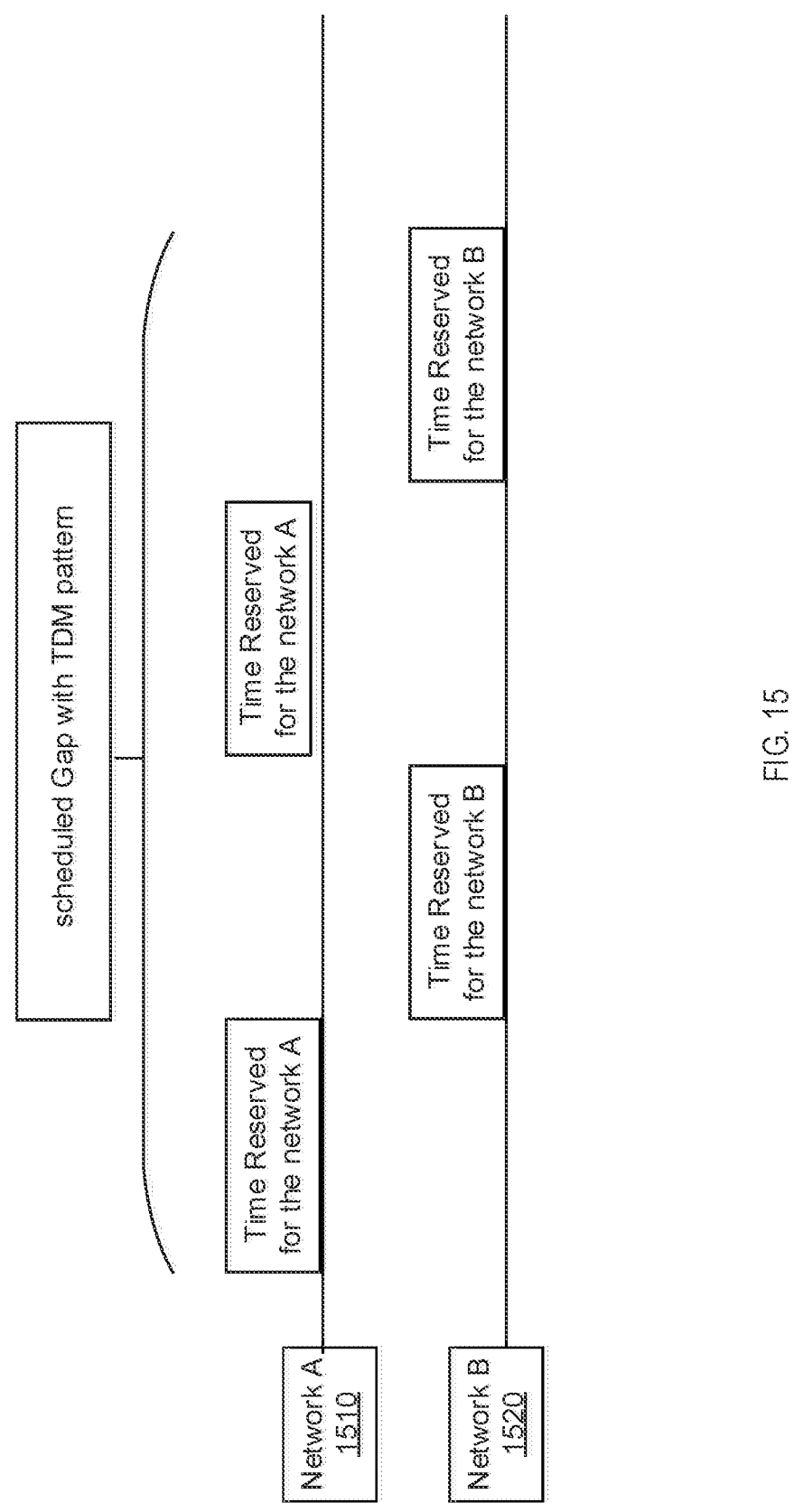
FIG. 15 shows a schematic diagram of an exemplary embodiment for wireless communication.

FIG. 15 shows an example for a gap with TDM pattern. Network A 1510 is a first network; and network B 1520 is the second network. The scheduled gap with TDM pattern may be similar to the measurement gap, in which the network A may reserves some gaps periodically during the leaving duration. In one implementation, the UE may inform the preferred TDM pattern as assistance information to the network. In another implementation, the UE need to provide sufficient assistance information for the network A to determine the TDM pattern during the scheduled gap.

Figure 16:
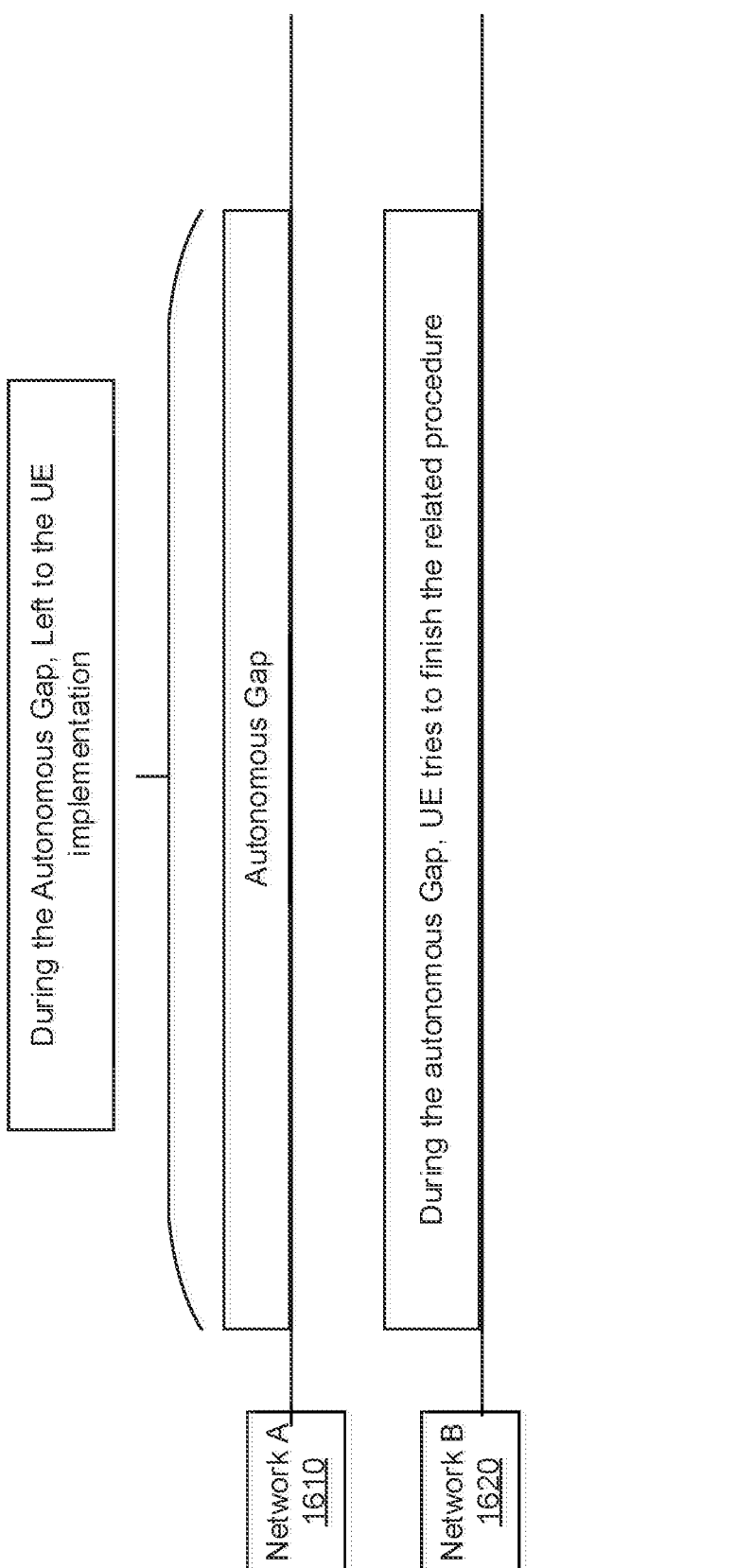
FIG. 16 shows a schematic diagram of an exemplary embodiment for wireless communication.

FIG. 16 shows an example for an autonomous gap. Network A 1610 is a first network; and network B 1620 is the second network. For the autonomous Gap, during the Gap, similar to some legacy MUSIM UE, it's left to the UE to implement how to communicate with the two networks (1610 and 1620). In one implementation, during the autonomous Gap, the UE may keep temporary and short dual active state by TDM method.

Figure 17:
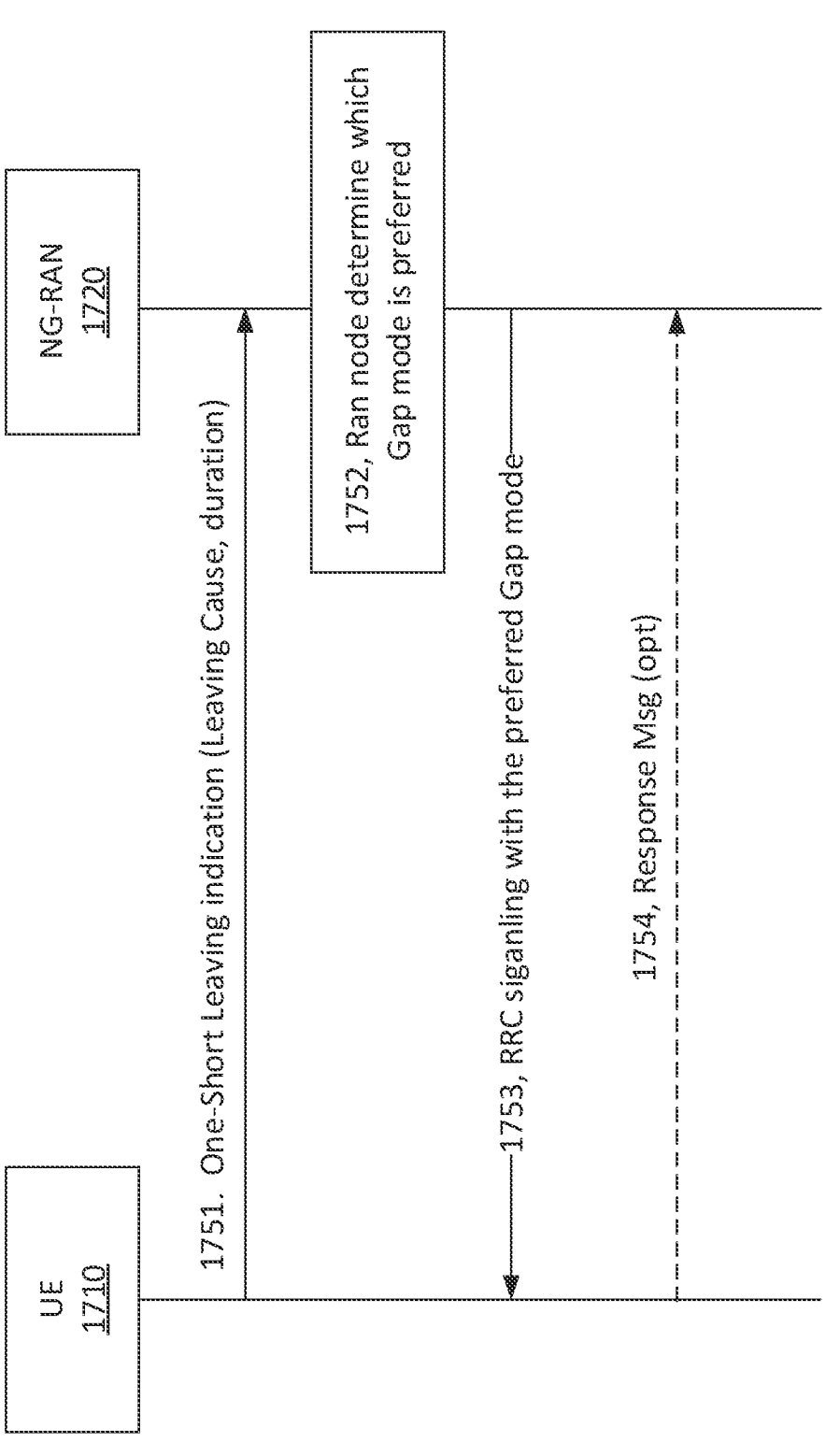
FIG. 17 shows a schematic diagram of an exemplary embodiment for wireless communication.

Referring to FIG. 17, in step 1751, the UE 1710 sends a one-shot leaving indication to the NG-RAN 1720. The one-shot leaving indication may include at least one of the leaving cause or leaving duration. In step 1752, the NG-RAN determines which gap mode is preferred. In step 1753, the NG-RAN sends RRC signaling with the preferred gap mode. Optionally in step 1754, the UE sends a response message to the NG-RAN.

In various embodiments, the network may indicate the gap mode to the UE for the leaving.

In one implementation, the gap mode may be a long scheduling gap, a gap with TDM mode, or an autonomous gap.

In another implementation, for the long scheduled gap, the gap length may equal to the short leaving duration, during the Gap the network shall avoid both DL and UL scheduling.

In another implementation, the gap length may be broadcasted in the system information or configured through the dedicated signaling, for the dedicated signaling, the network may adopt value recommended by the UE.

In another implementation, for the gap with TDM pattern, the network A may reserve the gap periodically during the leaving duration.

In another implementation, the duration that adopt gap with TDM mode may be broadcasted in the system information or configured through the dedicated signaling, for the dedicated signaling, the network may adopt value recommended by the UE.

In another implementation, the network may determine the TDM mode based on the TDM mode recommended by the UE, the ongoing services, the wireless environment.

In another implementation, the TDM mode may be a bit map for the subframe or for the frame, or indicated by start time, duration, period, and/or reference SCS.

In another implementation, for the autonomous Gap, during the Gap, it's left to the UE implementation on how to communicate with the two networks.

In another implementation, the network may determine the gap mode based on the ongoing service types, and/or quality of service (QoS) of the PDU sessions.

In another implementation, the network may send the gap mode information through the RRC signaling In another implementation, the RRC signal may be RRCReconfiguration message In another implementation, the network may also reject the leaving request by not assigning any gap.

In various embodiment, the UE may receive the Gap mode information from the gNB, and leave the current work based on the gap.

In one implementation, the gap mode may be a long scheduling Gap, a gap with TDM mode, or an autonomous gap.

In another implementation, for the scheduled gap, the gap length may equal to the short leaving duration, during the gap the network shall avoid both DL and UL scheduling.

In another implementation, the UE may indicate the gap length to the network or the leaving triggering Cause.

In another implementation, the leaving triggering cause may including the second, third, fourth and fifth scenarios as discussed above.

In another implementation, for the gap with TDM pattern, the gap may be reserved periodically during the leaving duration.

In another implementation, the UE may indicate the TDM pattern to the network.

In another implementation, the TDM mode may be a bit map for the subframe or for the frame, or indicated by start time, duration, period, and/or reference SCS.

In another implementation, for the autonomous gap, during the gap, it's left to the UE to implement how to communicate with the two networks.

In another implementation, for the autonomous gap, the UE may start a timer to control the autonomous gap duration.

In another implementation, for the autonomous gap, the UE may stop the autonomous gap timer when the work with the other USIM is finished.

In another implementation, for the autonomous gap, the UE may abort the procedure with the other USIM and back to the first USIM when the timer expiry.

In another implementation, the UE may receive the gap mode information through the RRC signaling.

In another implementation, the RRC signal may be RRCReconfiguration message

In another implementation, when the UE doesn't receive any gap mode information from the gNB, it's left to the UE implementation, or keep connected at the current network.

In the present disclosure, various embodiments may address at least one of the following issues regarding the one-short leaving: when the communication with network B ends before the scheduled/autonomous gap, whether the UE needs to indicate to the network A; and/or when the communication with the network B can't be finished before the scheduled/autonomous gap, whether the network A should keep at the connected state or back to Idle/Inactive state. In one implementation, for the first issue, the UE may send an indication to the network A once the communication with the network B is finished; and then the network A may restore the previous configuration and data transmission as soon as possible. In another implementation, for the second issue, whether the network A keep at the connected or back to Idle./Inactive state may be determined based on the service/procedure priorities of the one or more USIMs. For example, the one-shot leaving procedure may be adopted for the second, third, fourth, and fifth scenarios as discussed above. For the second and third scenarios as discussed above, compared with the data/voice service on the network A, it may have lower priority. For the fourth scenario, for the registration, per the CT1 spec, the UE may retransmit it for several times. For the MO signaling, for example, SMS, if it has high priority, it may adopt long-leaving procedure. For the RAU, it may lead UE enter into an idle state, and this kind of problem may be reduced by configure a long-enough gap. For the fifth scenario, the UE may resend it in the next DRX cycle, if still needed, e.g., detect paging again in the next DRX cycle.

As discussed above, the intention of the one-shot leaving procedure may be to reduce the impact to the network A as much as possible, thus, it's better to keep network A at the connected. In another implementation, it may also be determined by the network A to determine whether to keep at connected state, or the UE can give a suggestion when requiring gap.

In another implementation, when the communication with the network B can't be finished before the scheduled/autonomous gap timer expiry, the on-going procedure of the network B may be aborted and go on the services on the network A.

In another implementation, for the short leaving procedure for the fourth and fifth scenarios, the UE may try to finish the procedure on the network B as soon as possible. Meanwhile the network B may know that the UE is at short-leaving state of the other USIM, then the network B may not trigger the mobility, for example but not limited to, handover or redirection, measurement and DC related procedure, meanwhile the UE may also not trigger the reestablishment procedure.

In another implementation, the UE may inform the network B that it is at short leaving procedure on the other network, then the network B may avoid to trigger the mobility (e.g handover, redirection), measurement, and/or DC related procedures.

In another implementation, for the Idle state, the UE may indicate this information in a msg 5. While for the Inactive state, unless the procedure with ma-Update, the UE may also enter into connected state, thus the UE may also include this information in the message 5.

In another implementation, the UE may inform the network B that it is at short leaving procedure on the other network through RRC signaling.

In another implementation, the RRC signaling may be the Msg 5, e.g., RRCSetupComplete/RRCResumeComplete In another implementation, the RRC signaling may be the Msg 3 with different establish cause.

Figure 18:
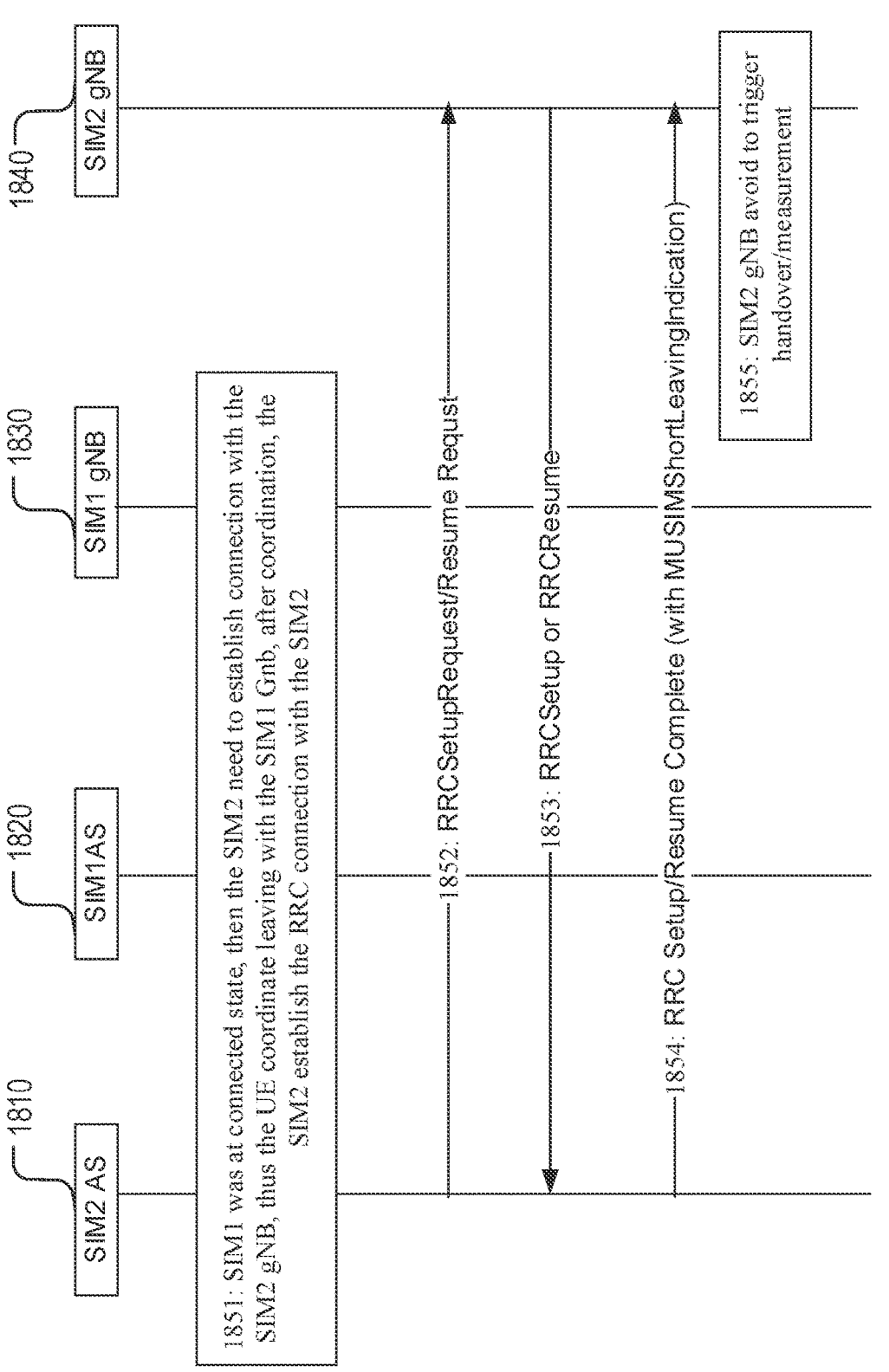
FIG. 18 shows a schematic diagram of an exemplary embodiment for wireless communication.

FIG. 18 shows an example of short leaving procedure indication to a second network. In step 1851: SIM1 1820 is at connected state, then the SIM2 1810 need to establish connection with the SIM2 gNB 1840, thus the UE coordinates leaving with the SIM1 gNB 1830; and after coordination, the SIM2 establishes the RRC connection with the SIM2. In step 1852: the SIM2 AS sends a RRC setup request or resume request to the SIM2 gNB. In step 1853, the SIM2 gNB sends a RRC setup or RRC resume to the SIM2 AS. In step 1854, the SIM2 AS sends a RRC Setup or resume complete (with an indication, e.g., MUSIMShortLeaving-Indication or a simple procedure indication) to the SIM2 gNB. In step 1855, the SIM2 gNB avoids to trigger handover or measurement.

In various embodiments, for a Msg5, Asn.1 coding for the Multi-Sim short leaving indication may be as the following.

```
RRCSetupComplete ::=            SEQUENCE {
    shortLeavingIndication(or simpleProcedureIndication)
    ENUMERATED {true}    Optional
    }
```

Wherein, one or more indication (e.g., shortLeavingIndication or the simpleProcedureIndication) may be used for the Multi-SIM UE. When the UE is at short leaving state on the other USIM card, the UE may indicate this indication to the current network for the current network to finish the procedure as soon as possible, the network may not trigger handover/measurement procedure.

In various embodiments, UE may have Multi-SIMs, and USIM1 with network A and USIM2 with network B. When the USIM1 is at connected state with the network A, and does short leave to the network B, the QoS of the USIM1 may be affected. Some PDU session may be affected or have to be released, thus a clear cause (e.g., MUSIM or MUSIM short leaving) may be added to the interfaces among the UE/RAN node/CN node. For example, for the PDU Session Resource Notify message, the purpose of the PDU Session Resource Notify procedure may be to notify that the already established QoS flow(s) or PDU session(s) for a given UE are released or not fulfilled anymore or fulfilled again by the NG-RAN node for which notification control is requested. Once the PDU session is released or not fulfilled anymore because of the MUSIM short leaving, it may include a new cause (e.g., MUSIM or MUSIM short leaving) to the CN node.

In one implementation, a new cause (e.g., MUSIM or MUSIM short leaving) may be added between the UE and RAN node or between the UE and the CN node or between the RAN and CN node or between two CN nodes.

Mobile Terminated (MT) Filter Assistance Information

When the UE is at connected state with high priority services with one network (e.g., Network A), the UE can't process the MT services with the lower priority, for this case the network may filter some paging triggered by the lower priority services if network gets some MT filter assistance information from the UE. In one implementation, the UE may send the MT filter information to the network for the following situations: the UE SIM1 is at connected state at the network A, the UE SIM2 need to process higher priority service. The UE SIM1 may have to enter into the idle/Inactive state, before entering into the Idle inactive state, the UE sends the MT filter assistance information to the network.

In various embodiments, the MT filter assistance information may include at least one of the following: an indication that the UE only is paged for a voice service comprising at least one of the following: a multimedia telephony (MMTel) voice service or circuit switched (CS) domain voice service for a evolved packet system (EPS); an indication that the UE is not be paged at all; a packet data network (PDN) connection for a MT notification and paging restriction; or a timer configuration for the MT filter assistance information, the timer configuration including a timer length.

Figure 19:
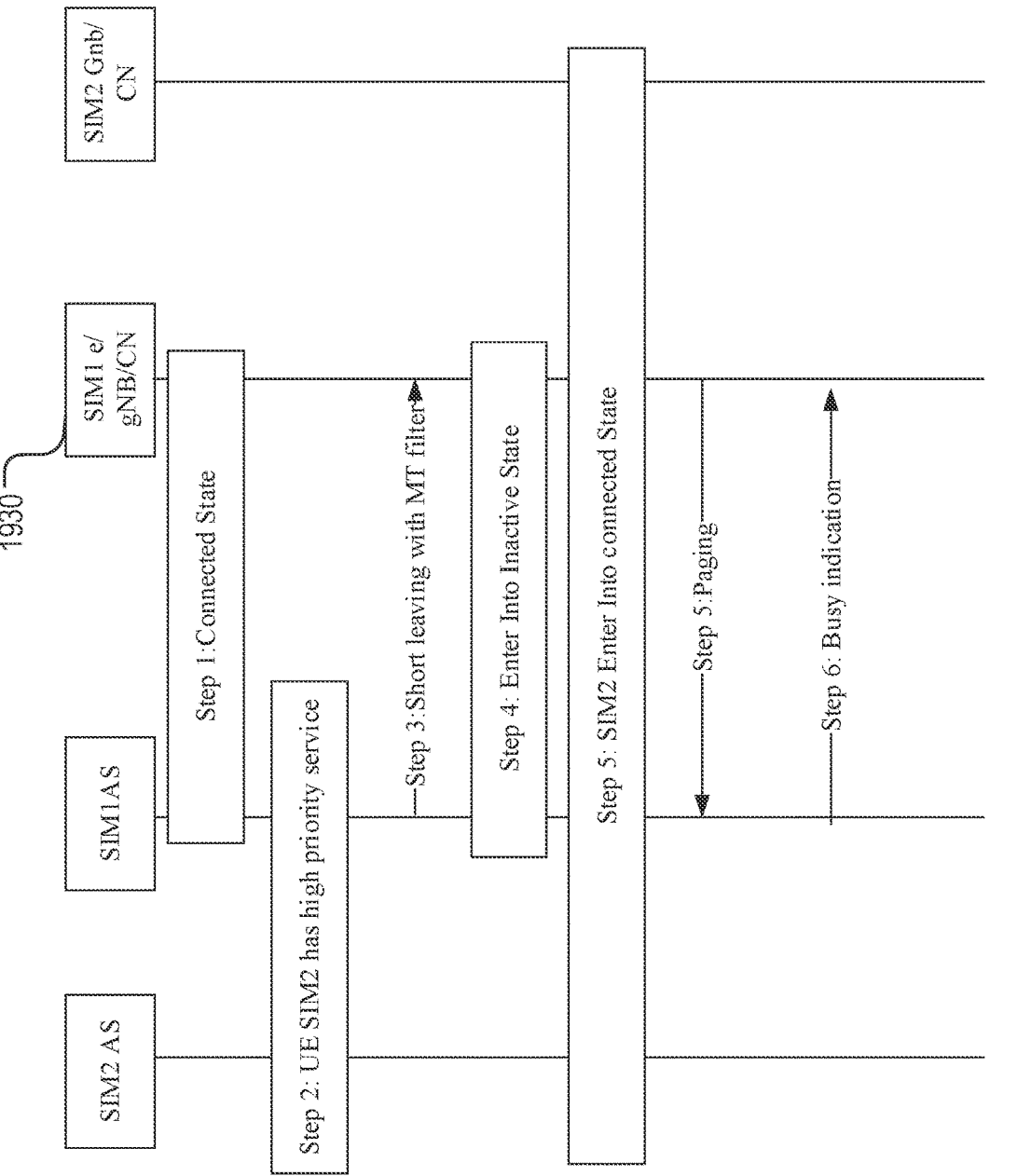
FIG. 19 shows a schematic diagram of an exemplary embodiment for wireless communication.
Figure 20:
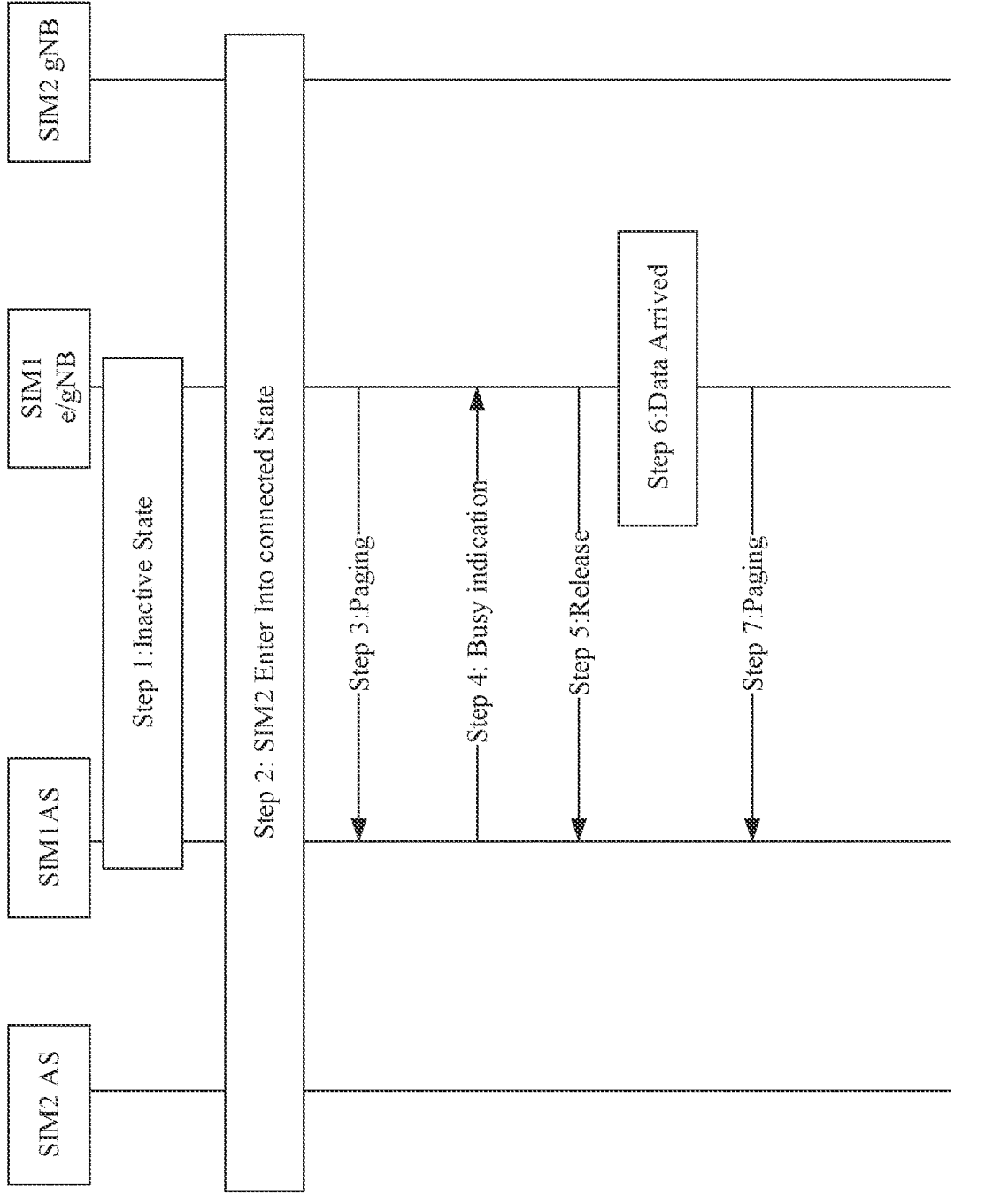
FIG. 20 shows a schematic diagram of an exemplary embodiment for wireless communication.

FIG. 19 shows an example, wherein the network 1930 may filter part of the paging. In one implementation, the gNB may store the paging filter information. FIG. 20 shows an example, wherein there isn't any paging filter, and the gNB may trigger the paging and the UE send the busy indication again. In one implementation, gNB may not store the paging filter information, and the paging may be triggered again because of the data arrived at the other PDU. In another implementation, for the case that the network (including RAN and/or CN node) doesn't store any MT filter assistance information, the paging may still be sent to the UE even it is triggered by the lower priority services and the UE can't process it. This problem maybe serious for the Inactive state UE, for that the RAN paging frequency in the Inactive state is much higher than the CN paging. The present disclosure describes various embodiments to address the problem discussed above.

For the Multi-SIM devices, USIM1 with network A and USIM2 with network B, when the USIM1 is at connected state with the network A, the USIM2 still need to detect paging from the network B, once the paging is detected, but the UE doesn't want to process this MT service on the network B, the UE may send a busy indication to the network B. In one implementation, when Multi-USIM device received paging by Network-A in RRC_Idle mode and the device decides to accept the paging, UE shall perform as existing procedure (send the Service Request message). In another implementation, when Multi-USIM device received paging by Network-A in RRC_Idle mode and the device decides not to accept the paging, a UE supporting NAS BUSY indication attempts to send a BUSY Indication via NAS message to network unless it is unable to do so e.g., due to UE implementation constraints. In another implementation, whether the busy indication is supported for RRC_Inactive case is up to RAN decision.

Figure 21:
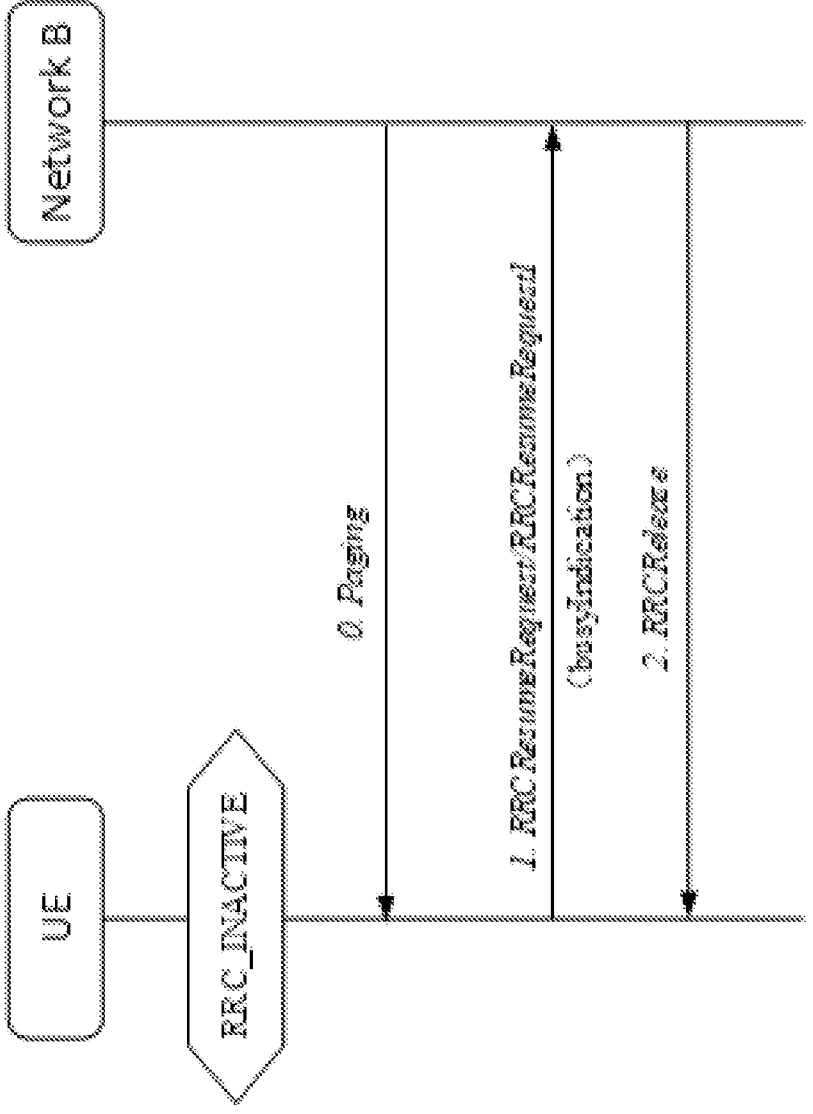
FIG. 21 shows a schematic diagram of an exemplary embodiment for wireless communication.
Figure 25:
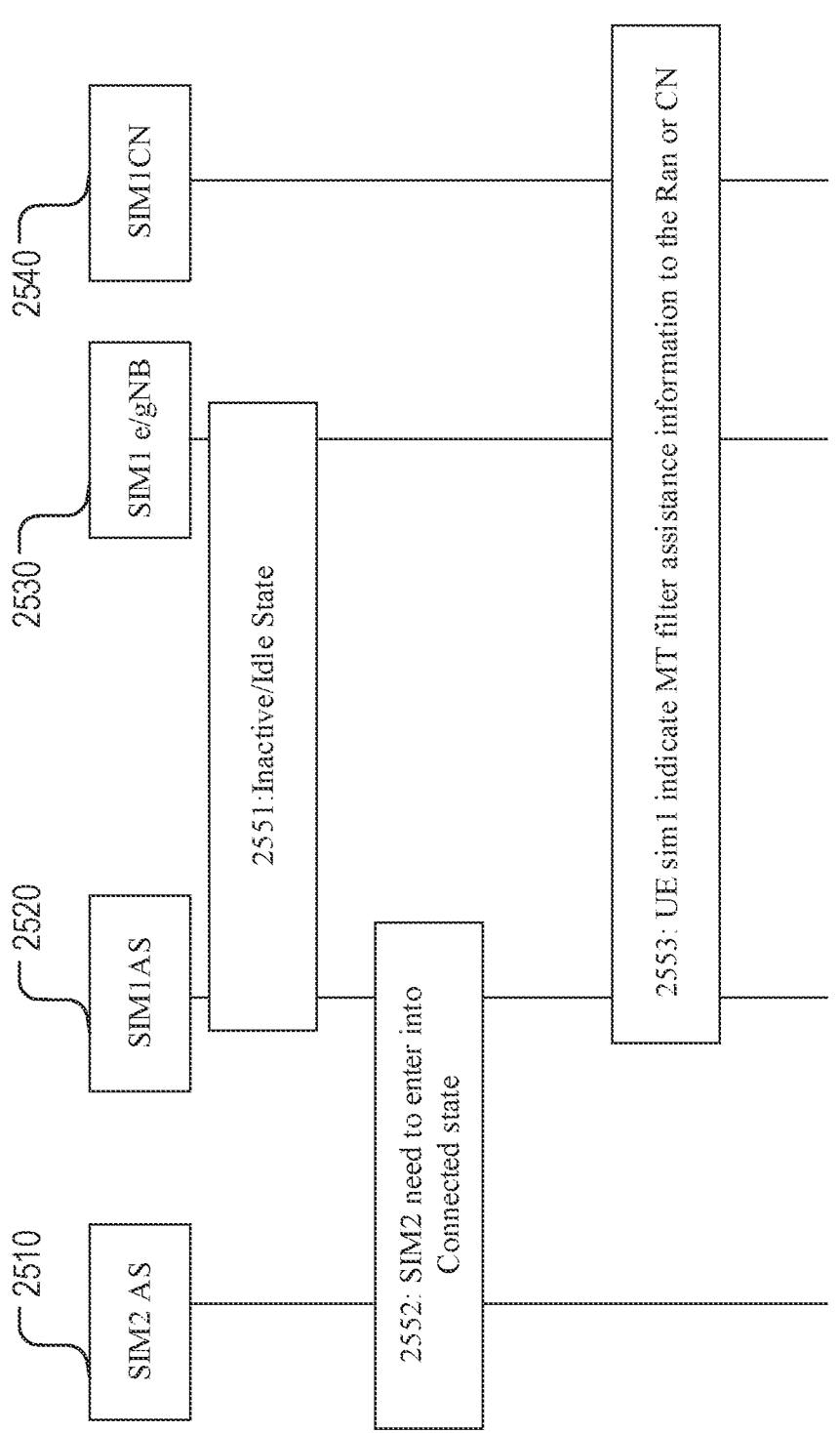
FIG. 25 shows a schematic diagram of an exemplary embodiment for wireless communication.
Figure 26:
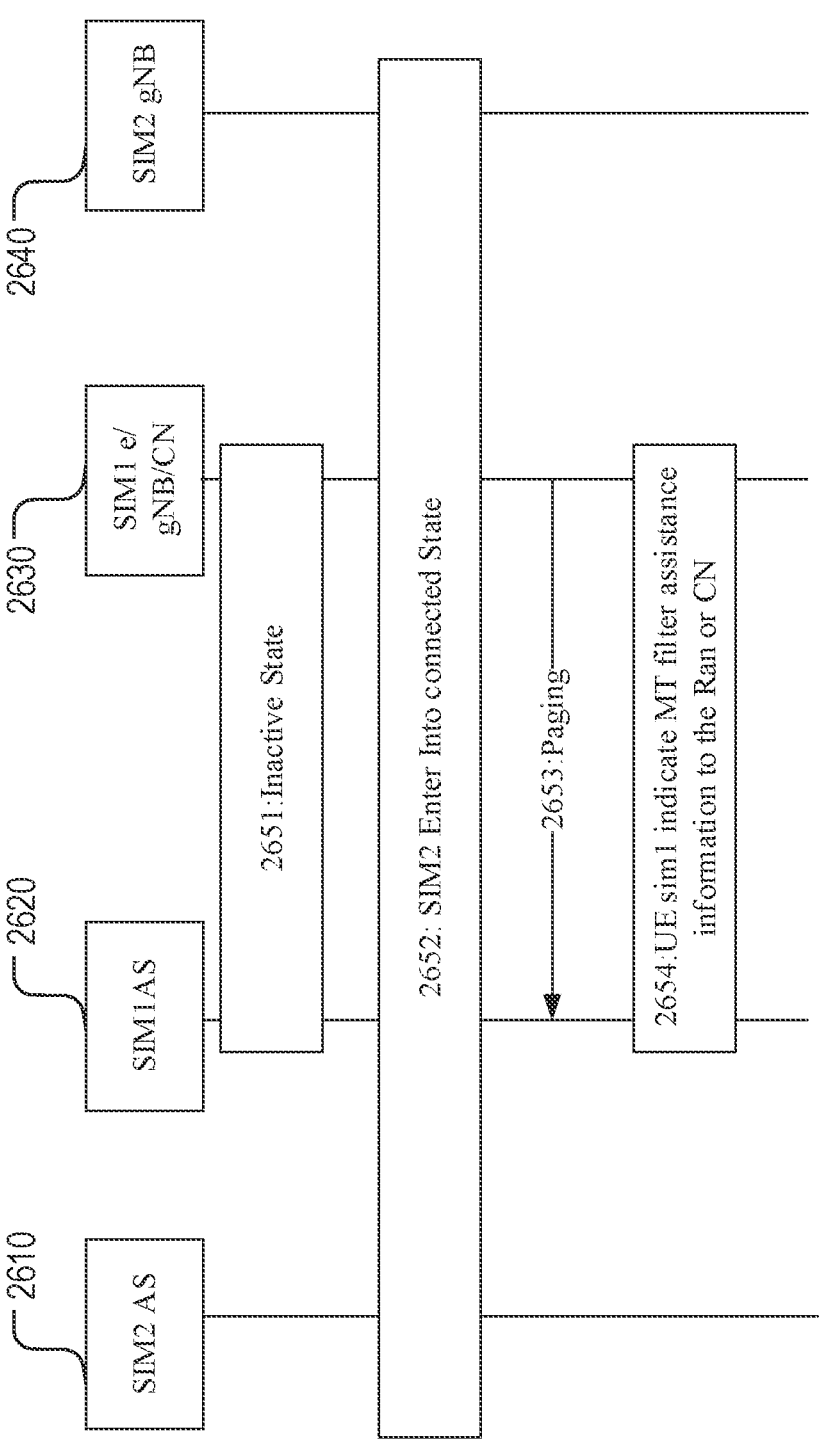
FIG. 26 shows a schematic diagram of an exemplary embodiment for wireless communication.

FIG. 21 shows a general procedure wherein busy Indication is sent from the UE to the network B.

Referring to FIG. 22, the present disclosure describes embodiments of a method 2200 for performing, by a user equipment (UE) corresponding to multiple networks comprising a first network and a second network, sending a mobile terminated (MT) filter assistance information. The method 2200 may include a portion or all of the following steps: step 2210: determining, by the UE, the MT filter assistance information; and step 2220: sending, by the UE, the MT filter assistance information to the first network.

Referring to FIG. 23, the present disclosure describes embodiments of a method 2300 for wireless communication. The method 2300 may include a portion or all of the following steps: step 2310: receiving, by a radio access network (RAN) node, a mobile terminated (MT) filter assistance information; and step 2320: filtering, by the RAN node, a paging to a user equipment (UE) based on the MT filter assistance information.

Referring to FIG. 24, the present disclosure describes embodiments of a method 2400 for wireless communication. The method 2400 may include a portion or all of the following steps: step 2410: receiving, by a core network (CN) node, a mobile terminated (MT) filter assistance information; and step 2420: filtering, by the CN node, a paging to a user equipment (UE) based on the MT filter assistance information.

In one implementation, the UE registers with the multiple networks by at least one of the following: registering the multiple networks with multiple subscriber identity modules (Multi-SIMs); or registering the multiple networks with a subscriber identity module (SIM).

In another implementation, the multiple networks comprises at least one of the following: multiple radio access networks (RANs) comprising a first RAN and a second RAN; multiple core networks (CNs) comprising a first CN and a second CN; or a RAN and a CN.

Trigger Condition for the MT Filter Assistance Information Reporting

In various embodiments, the UE may trigger the MT filter assistance information reporting in response to a trigger condition.

In one implementation, the trigger condition comprises that the UE has to enter from a connected state into an idle or inactive state with the first network and the UE has a higher priority service on the second network.

In another implementation, the trigger condition comprises that the UE is at an idle or inactive state with the first network and the UE needs to process service on the second network.

In another implementation, the trigger condition comprises that the UE detects a paging from the first network. For one case shown in FIG. 22, in step 2251, the UE SIM1 2220 is at idle/Inactive at the network A (SIM1 e/gNB 2230). In step 2252, the UE SIM2 2210 need to process higher priority service. In step 2253, the UE SIM1 indicates the MT filter assistance information to the network A 2230 or the CN node 2240.

For another case shown in FIG. 23, in step 2351, the UE SIM1 2320 is at idle/Inactive at the network A (SIM1 e/gNB/CN 2330). In step 2353, the UE SIM1 detects a paging, but the UE can't process the paging for that the UE SIM2 2310 need to process higher priority service with network B (SIM2 gNB 2340) (in process of performing step 2352). In step 2354, the UE SIM1 indicates the MT filter assistance information to the network A.

In various embodiments, the UE may determine the method based on the service types on the USIM2: a first method may be mainly adopted for the case that the service on the USIM2 is non-delay sensitive; and a second method may be mainly adopted for the case that the service on the USIM2 is delay sensitive. In one implementation, a first method is as the case shown in FIG. 22, and the second method is as the case shown in FIG. 23.

MT Filter Assistance Information Reporting Methods

In various embodiments, the UE may report MT filter assistance information by at least one of the following methods: including the MT filter assistance information by entering into the connected state; and including the MT filter assistance information by not entering into the connected state.

In the first method, the UE may report MT filter assistance information by entering into the connected state, which may be used by the inactive state UE and/or the idle state UE.

Figure 27:
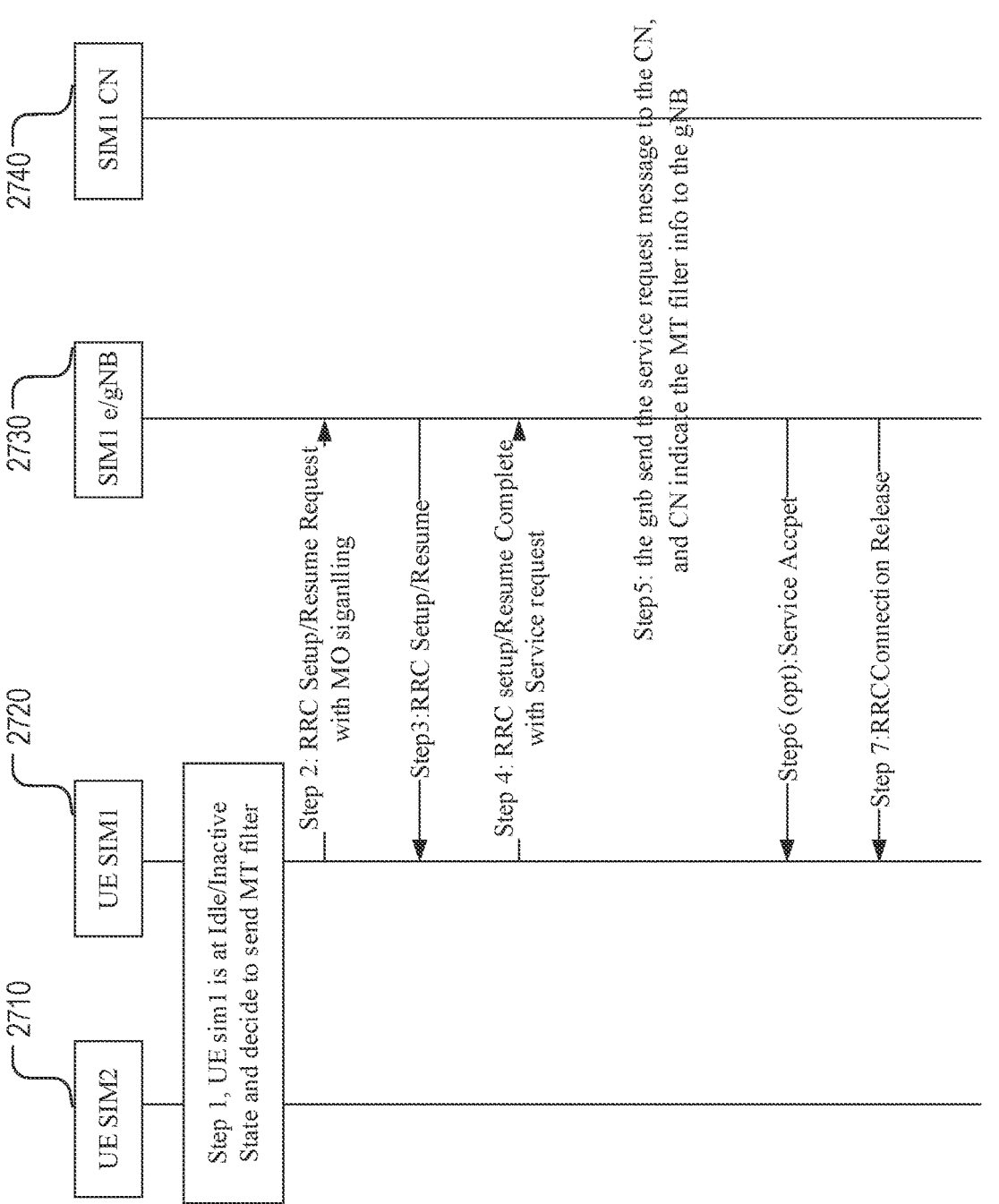
FIG. 27 shows a schematic diagram of an exemplary embodiment for wireless communication.

FIG. 27 shows an example of a MT filter assistance information reporting method by entering into the connected state. Step 1: a UE 2720 may determine to send MT filter assistance information to the network (SIM1 e/gNB 2730 and/or SIM1 CN 2740). Step 2~3: the UE may establish the connection with the network, with establish/resume cause to the MO signaling. Step 4: the UE may include the MT filter assistance information in the service request message and send it to the first network. Step 5: the RAN node 2730 may send the service request message to the CN 2740, and CN may indicate the MT filter info to the RAN node. Step 6: the CN may send a service accept to the UE. Step 7: the Ran node may send RRCConnection Release to the UE.

In the second method, the UE may report MT filter assistance information by not entering into the connected state, which may be adopted for the UE at the inactive state. In one implementation, the MT filter assistance information may be included by the different establish causes or the small data appending with Msg 3.

Figure 28:
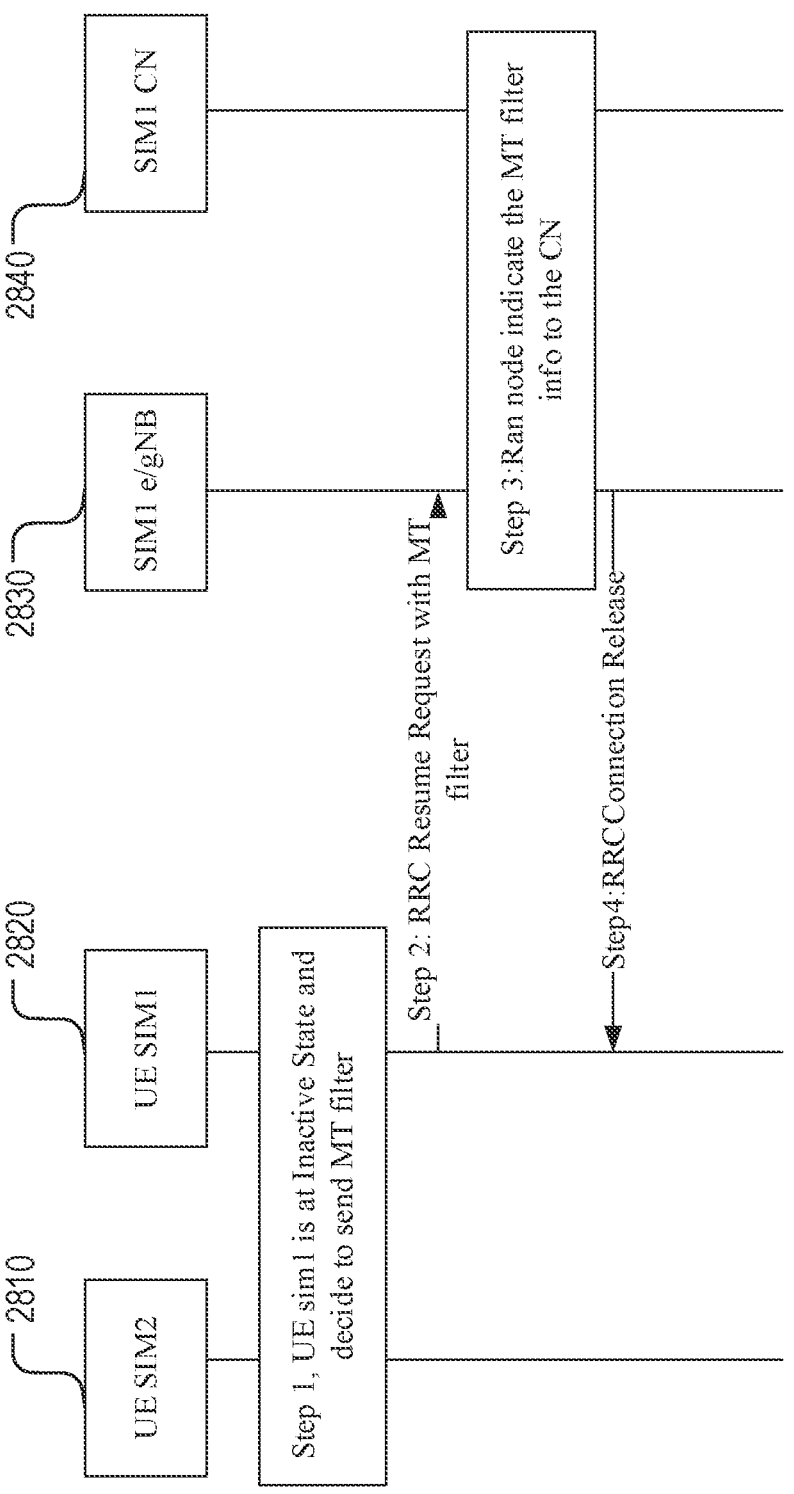
FIG. 28 shows a schematic diagram of an exemplary embodiment for wireless communication.

FIG. 28 shows an example of a MT filter assistance information reporting method by not entering into the connected state. The UE has a SIM1 2020 and a SIM2 2810. Step 1: the UE 2820 may determine to send MT filter assistance information to the network (SIM1 e/gNB 2830 and/or SIM1 CN 2840). Step 2: the UE may send the resume request, indicate the MT filter assistance information info by the different establish causes or the small data appending with the resume request. Optionally step 3: the RAN node may indicate the MT filter assistance information to the CN. Step 4: the RAN node may send RRCConnection Release to the UE.

In the second method, when the MT filter assistance information is triggered by a case as response to the paging, the MT filter assistance information may be sent together with busy indication.

Figure 29:
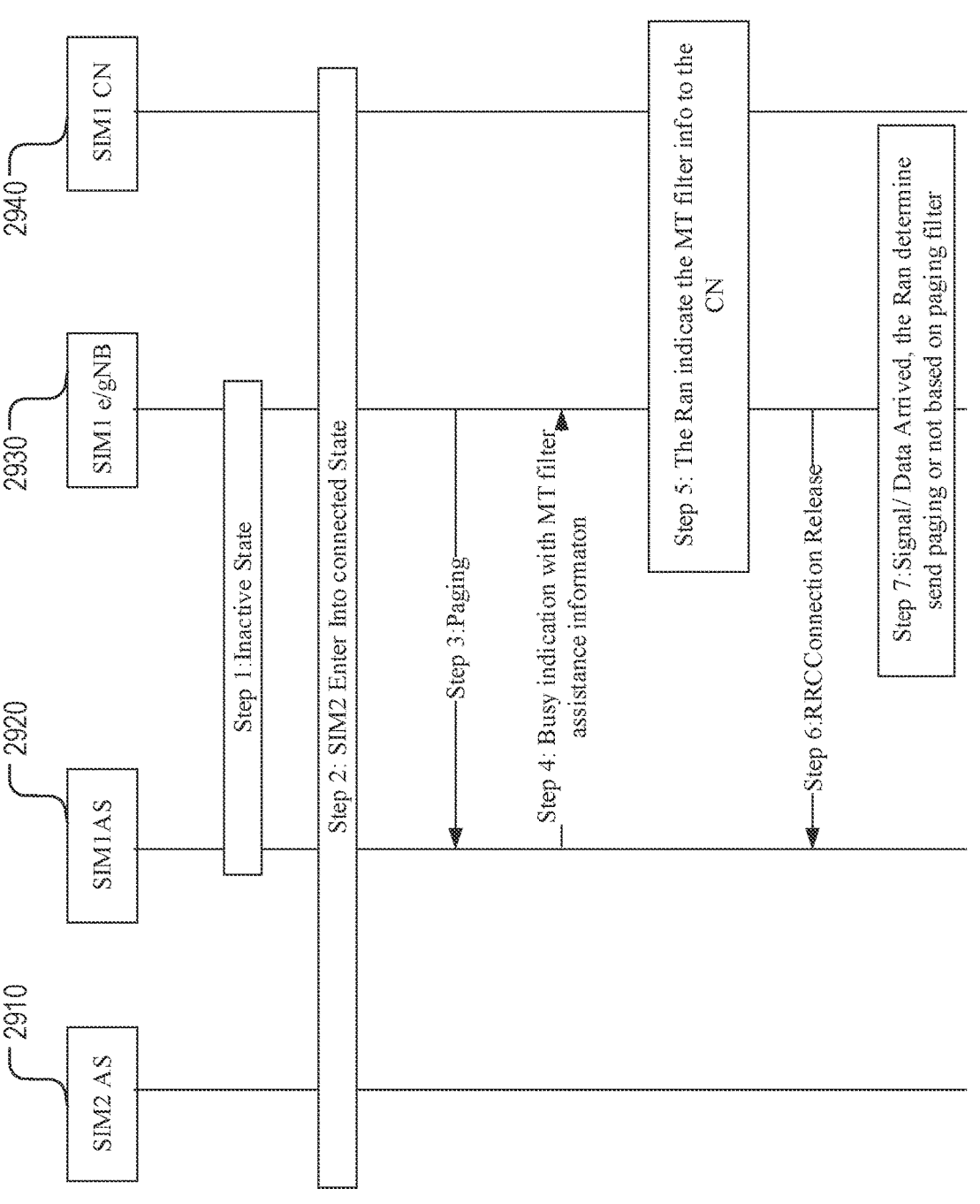
FIG. 29 shows a schematic diagram of an exemplary embodiment for wireless communication.

FIG. 29 shows an example of a MT filter assistance information reporting method by not entering into the connected state and being reported together with busy indication. Step 1: a SIM1 AS 2920 is in an Inactive State with SIM1 e/gNB 2930. Step 2: SIM2 2910 may enter into a connected State. Step 3: the UE 2920 receives paging from the RAN 2930. Step 4: the UE sends the resume request to indicate the busy indication together with the MT filter assistance information info by the different establish causes or the small data appending with the resume request. Optionally step 5: The RAN node may indicate the MT filter assistance information to the CN 2940. Step 6: the RAN node may send RRCConnection release to the UE.

In various embodiments, at least one cause may be added to the resume cause. In one implementation, two causes may be added to the resume cause, for example:

ResumeCause ::= ENUMERATED {emergency, highPriorityAccess, mt-
Access, mo-Signalling, mo-Data, mo-VoiceCall, mo-VideoCall, mo-SMS, rna-
Update, mps-PriorityAccess, mcs-PriorityAccess, no MT, voice only, spare3,
spare4, spare5 }

In one embodiment at the RAN node, the RAN node may receive the MT filter assistance information from the UE or the CN. In one implementation, for the case that the Ran node has stored the MT filter assistance information from the CN, but receiving a new MT filter assistance information from the UE, the RAN node may update the MT filter assistance information based on that reported by the UE. Furthermore, the RAN node may indicate the updated MT filter assistance information to the CN when enter into Idle state. In another implementation, the RAN node may filter the RAN paging based on the stored MT filter assistance information.

In one embodiment at the CN node, the CN node may receive the MT filter assistance information from the UE or the RAN. In one implementation, for the case that the CN node has stored the MT filter assistance information from the UE, but receiving a new MT filter assistance information from the RAN, the CN node may update the MT filter assistance information based on that reported by the RAN. In another implementation, the CN node may filter the CN paging based on the stored MT filter assistance information. In another implementation, the CN node may indicate the MT filter assistance information from the UE to the RAN.

MT Filter Assistance Information Revoking Methods

In various embodiments, the UE may, once the service on the network B finishes, indicate the MT paging filter revoke to the network A by at least one of the following methods: including the revoke indication by not entering into the connected state; including the revoke indication by entering into the connected state; and starting a timer for the MT filter assistance information, after timer expiry, the RAN or CN node revoking the MT filter assistance information. In one implementation, the first method may be adopted for the UE at the inactive state, the Revoke indication can be included by the establish cause. In another implementation, the second method may be used by the inactive state UE and/or the idle state UE.

Figure 30:
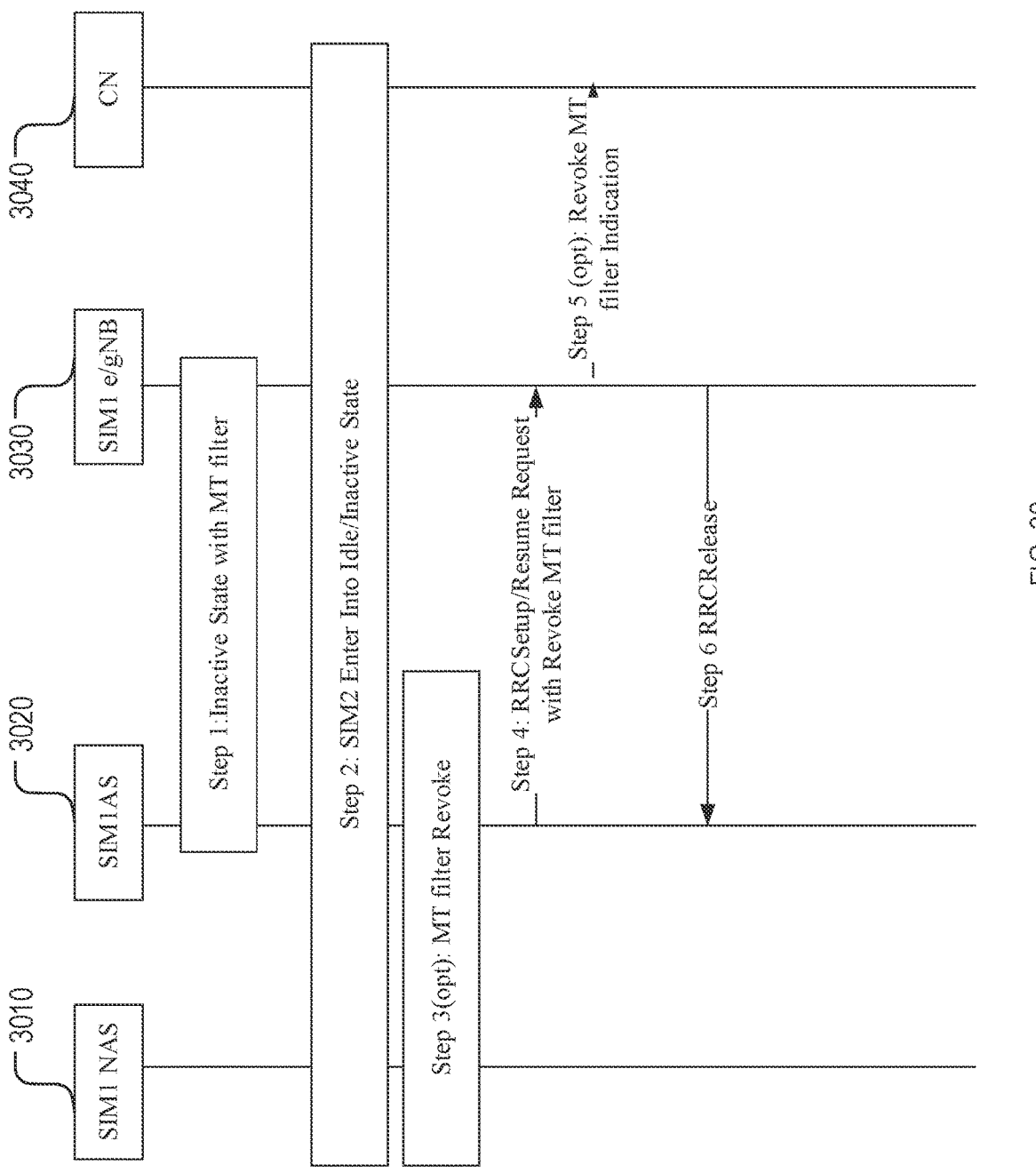
FIG. 30 shows a schematic diagram of an exemplary embodiment for wireless communication.

FIG. 30 shows an example of the UE sending the MT filter revoke indication without entering into a connected state with the first network. In step 1, the UE 3020 is at an inactive state with the first network 3030. In step 4, the UE sends the MT filter revoke indication to the first network by a resume cause.

In one implementation, the resume cause may include a MT filter revoke cause, for example, ResumeCause/Estab-lishmentCause::=ENUMERATED {emergency, highPriori-tyAccess, mt-Access, mo-Signalling, mo-Data, mo-Voice-Call, mo-VideoCall, mo-SMS, rna-Update, mps-PriorityAccess, mcs-PriorityAccess, paging resume, spare4, spare5}

Figure 31:
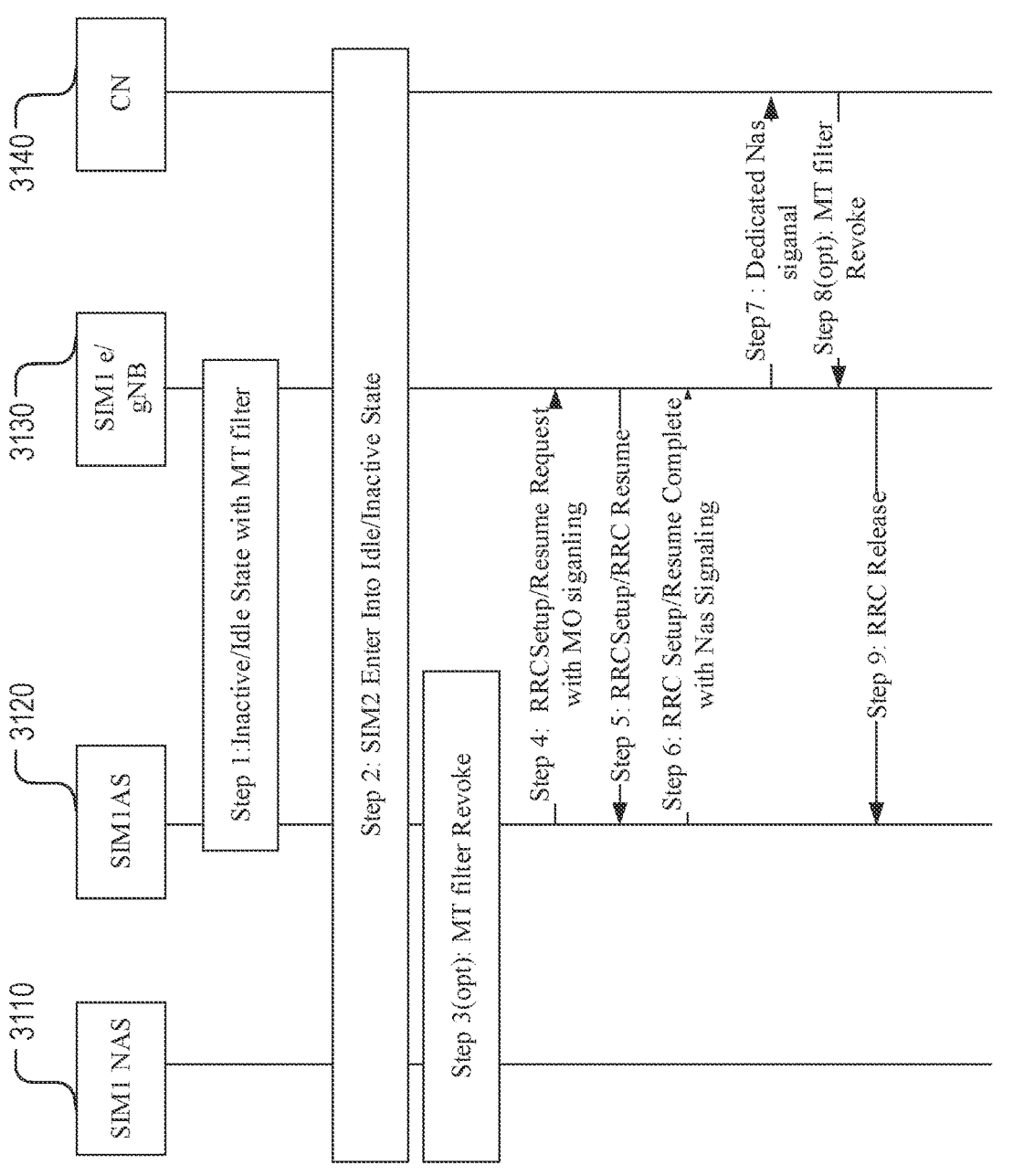
FIG. 31 shows a schematic diagram of an exemplary embodiment for wireless communication.

FIG. 31 shows an example of the UE sending the MT filter revoke indication by entering into a connected state with the first network. In step 1, prior to entering into the connected state with the first network, the UE 3120 is in an inactive state or in an idle state with the first network 3130. In step 4-6, the UE establish a connection with a message compris-ing a mobile originated (MO) signaling cause.

In one implementation, the message comprises at least one of the following: an access stratum (AS) message; or a non-access stratum (NAS) message. In another implemen-tation, the NAS message comprises a service request mes-sage.

In various embodiments, the UE starts a timer when sending the MT filter assistance information; the UE deletes the stored MT filter assistance information upon the timer being expiry; and the UE resumes the paging detection normally.

In one implementation, the UE receive a timer configu-ration from an As signaling or a NAS signaling. In another implementation, the NAS signaling comprises a register accept message. In another implementation, the AS signal-ing comprises at least one of the following: a system information (SI) or a dedicated AS signaling.

In one implementation, the UE send a timer configuration, e.g., timer length to the network to indicate the time length for the MT filter assistance information when send the MT filter assistance information through an AS signaling or a NAS signaling. In another implementation, the Network including Ran node or CN Node can adopt the timer configuration sent by the UE.

In one implementation, the network start the timer when receiving or when adopt the MT filter assistance informa-tion. In another implementation, the Network adopt the MT filter assistance information during the timer running. In another implementation, the Network adopt stop the timer when receive the revoke indication. In another implemen-tation, the Network may resume the paging normally when the timer is stopped or expiry.

In one embodiment at the RAN node, the RAN node may receive the revoke indication from the UE or the CN.

In one implementation, the RAN node may delete the stored MT filter assistance information.

In another implementation, the RAN node may resume the paging normally.

In another implementation, for the case that the RAN node receives the revoke indication form the UE, the RAN node may indicate the revoke indication to the CN.

In another embodiment at the CN node, the CN node may receive the revoke indication from the UE or the RAN.

In one implementation, the CN node may delete the stored MT filter assistance information.

In another implementation, the CN node may resume the paging normally.

In another implementation, for the case that the RAN node receives the revoke indication form the UE, the CN node may indicate the revoke indication to the RAN.

Paging Cause Indication

For indicating a paging cause, a "voice" indication may be added to the current paging message. In one implementation, "voice" may refer to MMTel voice (5GS and EPS) and CS domain voice (EPS only).

There are problems/issues associated with whether and how the UE discriminates (if needed) between paging for non-voice service and paging from legacy RAN node. For the paging from the legacy node, there would be no Paging Cause IE. For the paging form the release 17 (R17) gNB with paging cause indication from NG or Xn, the UE can get the paging cause. For the R17 gNB (without paging cause indication from NG or Xn), the UE can get the paging cause not present based on the Asn.1 coding, but it can't discriminates between paging for non-voice service and paging from legacy RAN node, see Table 2. In one situation, if the paging is broadcasting from the legacy RAN node, the UE can know that the paging cause was not supported by ASN.1 coding rule. In another situation, if the paging is broadcasting from the RAN node that support multi-SIMs, the UE can't distinguish between paging for non-voice service and paging from legacy CN/RAN node for the case that no paging cause (e.g., voice indication) is present.

When the UE can't discriminates between paging for non-voice service and paging from legacy RAN node, the UE may have two options: one option is to further check the paging cause by short leaving procedure; and/or another option is to take it as non-voice. Obviously, the second option may lead UE to miss some voice call, affecting the UE's experience badly; and the first option may introduce some unnecessary short leaving. Thus, problems include whether and how the UE discriminates (if needed) between paging for non-voice service and paging from legacy RAN node.

access network (RAN), a paging message to a user equipment (UE) including multiple subscriber identity modules (Multi-SIMs) corresponding to multiple RANs comprising a first RAN and a second RAN, wherein: the paging message comprises a first indication indicating a paging cause; and the paging message comprises a second indication indicating whether the paging cause is supported in the paging message.

In one implementation, in response to the second indication indicating that the paging cause is supported in the paging message and the first indication indicating the paging cause as voice, the UE determines the paging message as a voice paging message.

In another implementation, in response to the second indication indicating that the paging cause is supported in the paging message and the first indication not indicating any paging cause, the UE determines the paging message as a non-voice paging message.

In another implementation, in response to the second indication indicating that the paging cause is not supported in the paging message, the UE determines that the RAN does not support the paging cause.

TABLE 2

| Paging Cause In Various Releases | | |
| --- | --- | --- |
| gNB UE type | Legacy UE(R15/16) | R17 UE |
| R15/R16 gNB | N/A | No paging cause IE |
| R17 gNB (with Voice paging cause indication from NG or Xn) | N/A | Paging cause |
| R17 gNB (without voice paging cause indication from NG or Xn) | N/A | The paging cause IE would be absent, can't distinguish between |
| R17 gNB (The core network or the Ng/Xn interface doesn't support paging cause feature) | N/A | paging for non-voice service and paging from legacy CN/RAN node |

The present disclosure describes various embodiments of adding one bit to the paying message to discriminate between paging for non-voice service and paging from legacy RAN node, thus addressing the problems/issues discussed above.

Referring to FIG. 32, the present disclosure describes embodiments of a method 3200 for wireless communication. The method 3200 may include step 3210: receiving, by a user equipment (UE) including multiple subscriber identity modules (Multi-SIMs) corresponding to multiple radio access networks (RANs) comprising a first RAN and a second RAN, a paging message from a RAN of the multiple RANs, wherein: the paging message comprises a first indication indicating a paging cause; and the paging message comprises a second indication indicating whether the paging cause is supported in the paging message.

Referring to FIG. 33, the present disclosure describes embodiments of a method 3300 for wireless communication. The method 3300 may include step 3310: sending, by a radio In one embodiment, a set of indication is added to the Paging to indicate whether the paging cause is included or supported in the Paging message. In one implementation, if the paging indicates that it supports paging cause feature and indicates the paging cause is voice, the UE may take this paging as voice paging. In another implementation, if the paging indicates that it supports paging cause feature but doesn't indicate any paging cause, the UE may take this paging as non-voice paging. In another implementation, if the paging doesn't indicate support paging cause feature, the UE may think the network doesn't support paging cause indication.

In one example, a paging feature support indication is added to a paying message to indicate whether indicating whether the paging cause is supported in the paging message, for example as shown below:

```
Paging ::=                          SEQUENCE {
    pagingRecordList                    OPTIONAL, -- Need N
    lateNonCriticalExtension            OCTET STRING
OPTIONAL,
    nonCriticalExtension                SEQUENCE{ }
OPTIONAL
}
PagingRecordList ::=               SEQUENCE
(SIZE(1..maxNrofPageRec)) OF PagingRecord
```

-continued

```
PagingRecord ::=                SEQUENCE {
    ue-Identity                     PagingUE-Identity,
    accessType                          ENUMERATED {non3GPP}
OPTIONAL, -- Need N ...,
    [[pagingCauseSupported      ENUMERATED {TRUE} OPTIONAL,
-- Need N]],
    [[pagingCause               ENUMERATED {VOICE}
OPTIONAL, -- Need N]]
    }
    PagingUE-Identity ::=           CHOICE {
        ng-5G-S-TMSI                    ,
        fullI-RNTI                      I-RNTI-Value,
    }
```

Wherein pagingCauseSupported may indicate support paging cause feature or not, or indicate whether the paging cause included or not. If the PagingCauseSupported is set to TRUE and the pagingCause is set to Voice, the UE may take this paging as voice paging. If the PagingCauseSupported is set to TRUE but the pagingCause is absent, the UE may take this paging as non-voice paging. If both PagingCauseSupported and pagingCause are absent, the UE may think the network doesn't support paging cause indication.

The present disclosure describes methods, apparatus, and computer-readable medium for wireless communication. The present disclosure addressed the issues with coordinating leaving procedures for one or more devices including multiple subscriber identity modules (Multi-SIMs). The methods, devices, and computer-readable medium described in the present disclosure may facilitate the performance of wireless transmission between a user equipment and multiple network nodes, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
   in response to a trigger condition, performing, by a user equipment (UE) corresponding to multiple networks comprising a first network and a second network, sending a mobile terminated (MT) filter assistance information by:
   determining, by the UE, the MT filter assistance information; and
   sending, by the UE, the MT filter assistance information to the first network, wherein:
   the UE indicates a MT filter revoke indication to the first network, and
   the MT filter assistance information that is stored in the first network is deleted upon receiving the MT filter revoke indication from the UE.

2. The method according to claim 1, wherein:
   the UE registers with the multiple networks by at least one of the following:
   registering the multiple networks with multiple subscriber identity modules (Multi-SIMs); or
   registering the multiple networks with a subscriber identity module (SIM).

3. The method according to claim 1, wherein:
   the multiple networks comprise at least one of the following:
   multiple radio access networks (RANs) comprising a first RAN and a second RAN;
   multiple core networks (CNs) comprising a first CN and a second CN; or
   a RAN and a CN.

4. The method according to claim 1, wherein:
   the MT filter assistance information comprises at least one of the following:
   an indication that the UE only is paged for a voice service comprising at least one of the following: a multimedia telephony (MMTel) voice service or circuit switched (CS) domain voice service for a evolved packet system (EPS);
   an indication that the UE is not be paged at all;
   a packet data network (PDN) connection for a MT notification and paging restriction; or
   a timer configuration for the MT filter assistance information, the timer configuration including a timer length.

5. The method according to claim 1, wherein:
   the trigger condition comprises that the UE detects a paging from the first network.

6. The method according to claim 1, wherein:
   the UE sends the MT filter revoke indication without entering into a connected state with the first network.

7. The method according to claim 1: further comprising:
   sending, by the UE, a resume request with the MT filter revoke indication to the first network, and
   receiving, by the UE, a RRCConnection release from the first network.

8. The method according to claim 1, wherein:

the UE is at an inactive state with the first network; and the UE sends the MT filter revoke indication to the first network by a resume cause.

9. The method according to claim 1, further comprising:

sending, by the UE, the MT filter revoke indication by entering into a connected state with the first network.

10. The method of claim 1: further comprising sending, by the UE, a message to indicate to revoke the MT filter assistance information to the first network; and receiving, by the UE, a RRCConnection release from the first network.

11. The method according to claim 1, wherein:

the UE starts a timer when sending the MT filter assistance information;

the UE deletes the MT filter assistance information upon the timer being expiry; and the UE resumes a paging detection.

12. The method according to the claim 1, wherein:

the UE receive a timer configuration from an access stratum (AS) signalling or a non-access stratum (NAS) signalling;

the NAS signalling comprises a register accept message;

the AS signalling comprises at least one of the following: a system information (SI) or a dedicated AS signaling.

13. The method according to claim 1, wherein:

in response to receiving the MT filter revoke indication form the UE, the first network sends the MT filter revoke indication to a RAN node.

14. An apparatus comprising:

a memory storing instructions; and a processor in communication with the memory, wherein, when the processor executes the instructions, the processor is configured to cause the apparatus to perform, corresponding to multiple networks comprising a first network and a second network, in response to a trigger condition, sending a mobile terminated (MT) filter assistance information by:

determining the MT filter assistance information; and sending the MT filter assistance information to the first network, wherein:

the apparatus indicates a MT filter revoke indication to the first network, and the MT filter assistance information that is stored in the first network is deleted upon receiving the MT filter revoke indication from the apparatus.

15. A non-transitory computer-readable program medium storing instructions, wherein:

the instructions, when executed by a processor in an apparatus, are configured to cause the processor to perform, corresponding to multiple networks comprising a first network and a second network, in response to a trigger condition, sending a mobile terminated (MT) filter assistance information by:

determining the MT filter assistance information; and sending the MT filter assistance information to the first network, wherein:

the apparatus indicates a MT filter revoke indication to the first network, and the MT filter assistance information that is stored in the first network is deleted upon receiving the MT filter revoke indication from the apparatus.

* * * * *